(12) United States Patent
Stoll et al.

(10) Patent No.: US 10,210,559 B2
(45) Date of Patent: Feb. 19, 2019

(54) SYSTEMS AND METHODS FOR RECOMMENDATION SCRAPING

(71) Applicant: Wal-Mart Stores, Inc., Bentonville, AR (US)

(72) Inventors: Nathan Stoll, San Francisco, CA (US); Jan Magnus Stensmo, Foster City, CA (US); Stuart Payton Robinson, Berkeley, CA (US); Andrew Mark Ellerhorst, San Francisco, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 14/673,413

(22) Filed: Mar. 30, 2015

(65) Prior Publication Data

US 2015/0278916 A1   Oct. 1, 2015

Related U.S. Application Data

(63) Continuation-in-part of application No. 13/769,181, filed on Feb. 15, 2013.

(60) Provisional application No. 61/648,578, filed on May 17, 2012, provisional application No. 61/648,591, filed on May 17, 2012, provisional application No. 61/688,655, filed on May 18, 2012.

(51) Int. Cl.
*G06Q 30/06* (2012.01)
*G06Q 50/00* (2012.01)

(52) U.S. Cl.
CPC ..... *G06Q 30/0631* (2013.01); *G06Q 30/0609* (2013.01); *G06Q 50/01* (2013.01)

(58) Field of Classification Search
CPC .......... G06Q 50/01; G06Q 30/0601–30/0645; G06Q 30/0609; G06Q 30/06–30/08
USPC ................................................ 705/26.1–27.2
See application file for complete search history.

(56) References Cited

U.S. PATENT DOCUMENTS 5,550,576 A   8/1996   Klosterman
5,983,004 A   11/1999  Shaw et al.
(Continued)

FOREIGN PATENT DOCUMENTS

AU   2010017596   2/2010
JP   2004326634   11/2004
(Continued)

OTHER PUBLICATIONS

International Search Report and Written Opinion, PCT/US2013/041700, dated Sep. 17, 2013, 14 pgs.
(Continued)

*Primary Examiner* — Ming Shui
(74) *Attorney, Agent, or Firm* — Bryan Cave Leighton Paisner LLP

(57) ABSTRACT

Various embodiments of systems and methods for recommendation scraping include a method comprising receiving a content feed, wherein the content feed is associated with a holder and identifying at least one post within the content feed comprising a mention of a respective item. In many embodiments, the method can further comprise generating an item recommendation corresponding to the respective item, associating the item recommendation with a profile associated with the holder, and sending instructions to present the item recommendation to one or more users. Other embodiments are also disclosed herein.

19 Claims, 18 Drawing Sheets

(56) References Cited

U.S. PATENT DOCUMENTS

| | | |
|---|---|---|
| 6,185,221 B1 | 2/2001 | Aybay |
| 6,370,381 B1 | 4/2002 | Minnick |
| 6,487,390 B1 | 11/2002 | Virine |
| 6,912,588 B1 | 6/2005 | Jardin |
| 7,092,381 B2 | 8/2006 | Carlsson et al. |
| 7,302,429 B1 | 11/2007 | Wanker |
| 7,330,895 B1 | 2/2008 | Horvitz |
| 7,797,196 B1 | 9/2010 | Aaron et al. |
| 7,831,439 B1 | 11/2010 | Bryar et al. |
| 7,925,542 B2 | 4/2011 | Shah |
| 8,064,342 B2 | 11/2011 | Badger |
| 8,095,521 B2 | 1/2012 | Chan et al. |
| 8,170,897 B1 | 5/2012 | Cohen et al. |
| 8,181,232 B2 | 5/2012 | Grandcolas |
| 8,224,823 B1 | 7/2012 | Amacker |
| 8,407,765 B2 | 3/2013 | Wiley et al. |
| 8,612,208 B2 | 12/2013 | Cooper |
| 8,626,604 B1 | 1/2014 | Gandhi |
| 8,635,227 B2 | 1/2014 | Sankhla |
| 8,739,016 B1 | 5/2014 | Goldman et al. |
| 8,775,529 B2 | 7/2014 | Wright et al. |
| 8,935,192 B1 | 1/2015 | Ventilla et al. |
| 8,976,665 B2 | 3/2015 | Wiley et al. |
| 9,094,257 B2 | 7/2015 | Morrill et al. |
| 9,184,898 B2 | 11/2015 | Love et al. |
| 9,264,329 B2 | 2/2016 | Chrapko |
| 2001/0011235 A1 | 8/2001 | Kim et al. |
| 2001/0016496 A1 | 8/2001 | Lee |
| 2002/0052752 A1 | 5/2002 | Landesmann |
| 2002/0078138 A1 | 6/2002 | Huang |
| 2002/0087704 A1 | 7/2002 | Chesnais et al. |
| 2002/0099653 A1 | 7/2002 | De Souza et al. |
| 2002/0120581 A1 | 8/2002 | Schiavone |
| 2002/0188947 A1 | 12/2002 | Wang |
| 2003/0046173 A1 | 3/2003 | Benjier |
| 2003/0054827 A1 | 3/2003 | Schmidl et al. |
| 2003/0056216 A1 | 3/2003 | Wugofski et al. |
| 2003/0074253 A1 | 4/2003 | Scheuring et al. |
| 2003/0149580 A1 | 8/2003 | Moores |
| 2003/0188252 A1 | 10/2003 | Kim et al. |
| 2003/0127291 A1 | 11/2003 | Schramm-Apple et al. |
| 2004/0111374 A1 | 6/2004 | Goldstein |
| 2004/0117482 A1 | 6/2004 | Salazar |
| 2004/0117860 A1 | 6/2004 | Yi et al. |
| 2005/0004837 A1 | 1/2005 | Sweeney et al. |
| 2005/0086694 A1 | 4/2005 | Hicks et al. |
| 2005/0187883 A1 | 8/2005 | Bishop |
| 2005/0216144 A1 | 9/2005 | Baldassa |
| 2006/0047598 A1 | 3/2006 | Hansen |
| 2006/0277591 A1 | 12/2006 | Arnold et al. |
| 2007/0043583 A1 | 2/2007 | Davulcu et al. |
| 2007/0143816 A1 | 6/2007 | Gupta et al. |
| 2007/0199019 A1 | 8/2007 | Angiolillo et al. |
| 2007/0219880 A1 | 9/2007 | Stone et al. |
| 2007/0239552 A1 | 10/2007 | Sundaresan |
| 2007/0266097 A1 | 11/2007 | Harik et al. |
| 2008/0065445 A1 | 3/2008 | Livesay et al. |
| 2008/0177763 A1 | 7/2008 | Lang et al. |
| 2008/0271080 A1 | 10/2008 | Gossweiler et al. |
| 2008/0300940 A1 | 12/2008 | Aravamudan |
| 2009/0013053 A1 | 1/2009 | Wehner |
| 2009/0019484 A1 | 1/2009 | Jo et al. |
| 2009/0106366 A1 | 4/2009 | Virtanen et al. |
| 2009/0132395 A1 | 5/2009 | Lam |
| 2009/0171760 A1 | 7/2009 | Aarnio |
| 2009/0175214 A1 | 7/2009 | Sfar et al. |
| 2009/0190544 A1 | 7/2009 | Meylan et al. |
| 2009/0222873 A1 | 9/2009 | Einarsson |
| 2009/0228339 A1 | 9/2009 | Wolf et al. |
| 2009/0234749 A1 | 9/2009 | Fjellanger et al. |
| 2009/0276284 A1 | 11/2009 | Yost |
| 2009/0319436 A1 | 12/2009 | Andra et al. |
| 2010/0049654 A1 | 2/2010 | Pilo |
| 2010/0076775 A1 | 3/2010 | Tesler et al. |
| 2010/0115419 A1 | 5/2010 | Mizuno |
| 2010/0235256 A1 | 9/2010 | Kang |
| 2010/0279618 A1 | 11/2010 | Morton et al. |
| 2010/0312724 A1 | 12/2010 | Pinckney |
| 2011/0022465 A1 | 1/2011 | Malleshaiah et al. |
| 2011/0106674 A1 | 5/2011 | Perlman |
| 2011/0131106 A1* | 6/2011 | Eberstadt ............... G06Q 10/10 705/26.1 |
| 2011/0173056 A1 | 7/2011 | D'Alessio et al. |
| 2011/0173095 A1 | 7/2011 | Kassaei et al. |
| 2011/0225048 A1 | 9/2011 | Nair |
| 2011/0252121 A1 | 10/2011 | Borgs |
| 2011/0255448 A1 | 10/2011 | Hartman et al. |
| 2011/0276377 A1 | 11/2011 | Kim |
| 2011/0276631 A1 | 11/2011 | Schmitt |
| 2011/0282941 A1 | 11/2011 | Chan et al. |
| 2011/0320373 A1 | 12/2011 | Lee et al. |
| 2012/0005209 A1 | 1/2012 | Rinearson et al. |
| 2012/0016678 A1 | 1/2012 | Gruber et al. |
| 2012/0030210 A1 | 2/2012 | Sankhla et al. |
| 2012/0065884 A1 | 3/2012 | Sung et al. |
| 2012/0095841 A1 | 4/2012 | Luckerman et al. |
| 2012/0095862 A1 | 4/2012 | Schiff |
| 2012/0109781 A1 | 5/2012 | Felt |
| 2012/0109792 A1 | 5/2012 | Eftekhari |
| 2012/0117584 A1 | 5/2012 | Gordon |
| 2012/0136756 A1 | 5/2012 | Jitkoff et al. |
| 2012/0163309 A1 | 6/2012 | Ma et al. |
| 2012/0166333 A1 | 6/2012 | Von Behren et al. |
| 2012/0170534 A1 | 7/2012 | Kim et al. |
| 2012/0197722 A1 | 8/2012 | Mesaros |
| 2012/0197979 A1 | 8/2012 | Palm |
| 2012/0203832 A1* | 8/2012 | Vastardis ............ G06Q 30/0241 709/204 |
| 2012/0209839 A1 | 8/2012 | Andrews et al. |
| 2012/0253790 A1 | 10/2012 | Heck et al. |
| 2012/0254096 A1 | 10/2012 | Flinn et al. |
| 2012/0278127 A1 | 11/2012 | Kirakosyan |
| 2012/0278625 A1 | 11/2012 | Narayanan et al. |
| 2012/0284144 A1 | 11/2012 | Herbst et al. |
| 2012/0290399 A1* | 11/2012 | England ............ G06Q 30/0282 705/14.66 |
| 2012/0296978 A1* | 11/2012 | Inoue ..................... G06F 17/30 709/204 |
| 2012/0303425 A1 | 11/2012 | Katzin et al. |
| 2012/0330980 A1 | 12/2012 | Rubin et al. |
| 2013/0013807 A1 | 1/2013 | Charapko et al. |
| 2013/0054407 A1* | 2/2013 | Sabur ..................... G06Q 50/01 705/26.7 |
| 2013/0060625 A1 | 3/2013 | Davis et al. |
| 2013/0060850 A1 | 3/2013 | Davis |
| 2013/0073989 A1* | 3/2013 | Harris ................... G06Q 10/10 715/758 |
| 2013/0091013 A1 | 4/2013 | Wang |
| 2013/0094537 A1 | 4/2013 | Hui et al. |
| 2013/0097056 A1 | 4/2013 | Sun et al. |
| 2013/0097142 A1 | 4/2013 | Kim et al. |
| 2013/0124357 A1 | 5/2013 | He et al. |
| 2013/0173334 A1 | 7/2013 | Etchegoyen |
| 2013/0178239 A1 | 7/2013 | Roberts et al. |
| 2013/0179440 A1 | 7/2013 | Gordon |
| 2013/0191316 A1 | 7/2013 | Etchegoyen |
| 2013/0219468 A1 | 8/2013 | Bell |
| 2013/0291007 A1 | 10/2013 | Shimy et al. |
| 2013/0332307 A1 | 12/2013 | Linden |
| 2014/0258243 A1 | 9/2014 | Bell |

FOREIGN PATENT DOCUMENTS

| | | |
|---|---|---|
| JP | 2007249833 | 9/2007 |
| JP | 2009123192 | 6/2009 |
| JP | 2011170471 | 9/2011 |
| KR | 20010076971 | 8/2001 |
| KR | 20020090816 | 12/2002 |
| KR | 100825204 | 4/2008 |
| KR | 20110117475 | 10/2011 |

(56) References Cited

FOREIGN PATENT DOCUMENTS

| WO | 2010017596 | 2/2010 |
|---|---|---|
| WO | 2010099632 | 9/2010 |

OTHER PUBLICATIONS

International Search Report and Written Opinion, PCT/US2013/041702, dated Aug. 27, 2013, 12 pgs.
International Search Report and Written Opinion, PCT/US2013/041705, dated Aug. 27, 2013, 12 pgs.
International Search Report and Written Opinion, PCT/US2013/041707, dated Aug. 27, 2013, 10 pgs.
International Search Report and Written Opinion, PCT/US2013/041714, dated Aug. 27, 2013, 11 pgs.
Blake, P. (1997), Exploring the news, Information World Review, (121), 17-18, Retrieved from http://search.proquest.com/docview/199371966?accountid=14753.
"Propagation of Trust and Distrust." Guha, R.; Kumar, Ravi; Raghavan, Prabhakar; Tomkins, Andrew. WWW '04 Procedding of the 13th. Mar. 2004.
Adweek. (Apr. 23, 2009). Retailers Utilize Facebook Connect to Make Online Shipping More Social, Personal. Retrieved Apr. 14, 2017, from http://www.adweek.com/digital/retailers-utilize-facebook-connect-to-make-shopping-more-social-personal/ Apr. 23, 2009.
Entrepreneurr. (Mar. 17, 2012). A Platform for Stylepreneurs: Pintrest Meets Online Department Store. Retrieved Apr. 14, 2017, from http://web-beta.archive.org/web/20120319191411/https://www.entrepreneur.com/article/222812 Mar. 17, 2012.
Merriam-Webster, "cease", 2015 Aug. 4, 2015.
Merriam-Webster, "majority", 2015 Aug. 4, 2015.
Merriam-Webster, "primary", 2015 Aug. 4, 2015.
Merriam-Webster, "log on", 2016 May 20, 2016.
Merriam-Webster, "log out", 2016 May 20, 2016.
Merriam-Webster, "schedule", 2016 Jan. 1, 2016.
Talisma email and answer product combo addresses volume email challengers. (Jul. 31, 2008). Business Wire, retrieved from https://dialog.proquest.com/professional/docview/677381891?accountid=142257 Jul. 31, 2008.

\* cited by examiner

SYSTEMS AND METHODS FOR RECOMMENDATION SCRAPING

RELATED APPLICATIONS

This application is a continuation in part of U.S. application Ser. No. 13/769,181, entitled "Trust Graphs," filed Feb. 15, 2013, which claims priority to U.S. Provisional Patent Application Nos. 61/648,578, entitled "Trust Graphs," filed May 17, 2012, 61/648,591, entitled "System And Method For Social Network Based Referrals," filed May 17, 2012, and 61/688,655, entitled "System And Method For Social Network Based Referrals," filed May 18, 2012. All of these applications are incorporated by reference herein in their entirety.

TECHNICAL FIELD

The disclosed implementations relate to the field of online commerce generally and in particular to using trust connections to improve product recommendations (e.g., recommendations for goods and services).

BACKGROUND

Over the last two decades, the buying and selling of products through computer networks such as the Internet has increased dramatically. A significant portion of all commerce is now conducted online through the Internet. As the amount of commerce conducted online grows, the number of online commerce venues also grows. As such, online vendors compete with each other to offer users the best user experience. One way to differentiate from other online retailers is to provide products most suitable to the needs of the users.

Purchasing goods and services online has advantages and drawbacks. Purchasing goods online allows consumers to shop and compare products easily from their own home or mobile device. Additionally, consumers have a much wider range of goods available for selection. Thus, consumers can quickly search through and review many options.

However, when shopping online the social aspects of more traditional commerce are lost. The large number of options available to consumers at any given time can result in difficulty finding the optimal product for the user's needs. Traditionally, consumers can rely on social structures to help evaluate different options when shopping. For example, when shopping in a retail store, shoppers can get purchasing advice from salespeople or friends and family who accompany them. Shopping online removes this social experience as it is typically done alone.

Additionally, purchasing goods and services online can be more complicated than purchasing goods in person. For example, purchasing online often involves filling out time-consuming forms, including manually inputting payment methods and arranging for shipment of the product. Then, unlike traditional shopping, the purchaser must wait for delivery of the good. As such, online commerce websites need to focus on the advantages of shopping online, while also minimizing the disadvantages.

Another significant use of computer networks, such as the Internet, is computer based social networking. Websites like Facebook and Twitter allow their users to find and maintain relationships with other people through status updates and messages. Users can maintain an awareness of the lives of their friends, family members, and acquaintances that would otherwise be difficult to keep in close contact with.

BRIEF DESCRIPTION OF THE DRAWINGS

To facilitate further description of the embodiments, the following drawings are provided in which.

Figure 1:
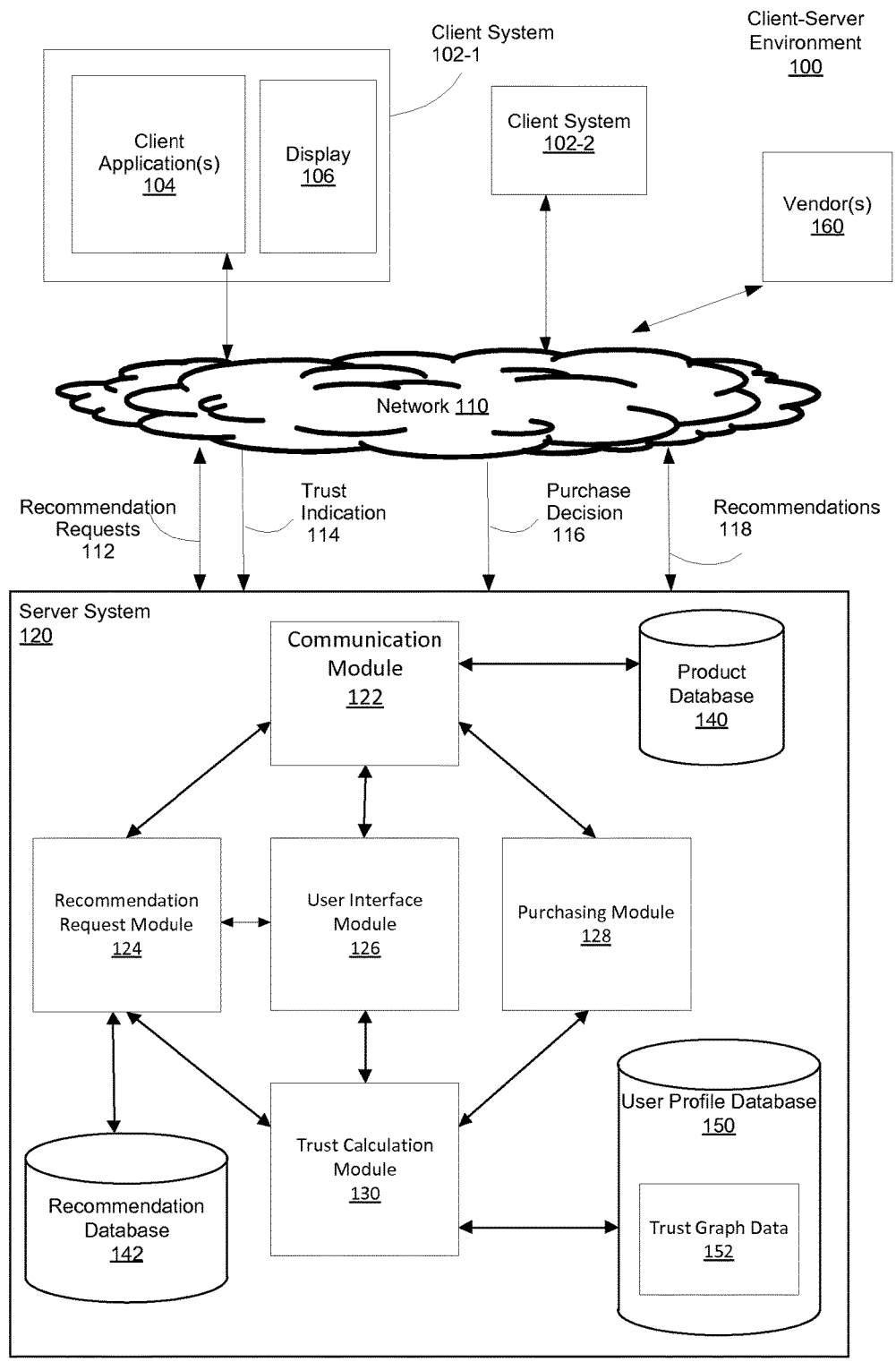
FIG. 1 is a block diagram illustrating a client-server environment in accordance with some implementations.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Various embodiments of systems and methods for obtaining product recommendations include a method comprising receiving from a requestor a recommendation request and determining a first level category associated with the recommendation request. In many embodiments, the method further comprises sending instructions to display the recommendation request to one or more first users within a trust network of the requester, wherein the first users are identified as trusted by the requester with respect to the first level category, and if one or more first conditions are satisfied, send instructions to display the recommendation request to one or more second users, wherein each second user is within a respective trust network of a respective first user and is identified as trusted by the respective first user with respect to the first level category.

In some embodiments, a method comprises receiving from a requestor a recommendation request and determining one or more categories associated with the recommendation request. In many embodiments, the method further comprises identifying candidate recommenders within a predefined number of degrees from the requester within a trust network of the requester, scoring the candidate recommenders based on one or more predefined criteria, and selecting a first number of the candidate recommenders with preferred scores based on the one or more predefined criteria. The method can further comprise sending instructions to display the recommendation request to the first number of candidate recommenders.

Many embodiments of systems and methods for obtaining product recommendations include a system comprising one or more processors and memory storing one or more programs to be executed by the one or more processors. In some embodiments, the one or more programs comprise instructions for receiving from a requester a recommendation request, determining a first level category, within a hierarchy of categories, associated with the recommendation request, and presenting the recommendation request to one or more first users within a trust network of the requester, wherein the first users are identified as trusted by the requester with respect to the first level category. In some embodiments, if one or more first conditions are satisfied, the one or more programs further comprise instructions for presenting the recommendation request to one or more second users, wherein each second user is within a respective trust network of a respective first user and is identified as trusted by the respective first user with respect to the first level category.

Various embodiments of methods and systems for providing a catalog of trending and trusted items include a method comprising determining a plurality of first recommendations from a set of users within a trust network of a first user, wherein each user from the set of users is associated with one of the plurality of first recommendations, determining respective time differences between respective chronologically successive first recommendations of the plurality of first recommendations, and determining one or more second recommendations that satisfy one or more popularity criteria. In many embodiments, the method further comprises arranging for display the first recommendations in a chronologically based order, and one or more of the second recommendations, wherein a respective second recommendation is inserted between respective chronologically successive first recommendations whose time difference is greater than a threshold.

In some embodiments, a method comprises determining a plurality of first recommendations from a set of users within a trust network of a first user, wherein each user from the set of users is associated with one of the plurality of first recommendations, determining respective time differences between respective chronologically successive first recommendations of the plurality of first recommendations, and determining one or more second recommendations that satisfy one or more popularity criteria. In many embodiments, the method can further comprise arranging for display a catalog of recommendations for the first user the first recommendations in a chronologically based order and one or more of the second recommendations, wherein a respective second recommendation is inserted between respective chronologically successive first recommendations whose time difference is greater than a threshold. In some embodiments, the one or more popularity criteria comprise at least one of (1) the respective second recommendation of the one or more second recommendations is recommended by at least a minimum number of users from the set of users; (2) the respective second recommendation of the one or more second recommendations is recommended by a trusted user from the set of users, the trusted user has a trust level of at least a minimum trust level from a perspective of the first user; or (3) for the respective second recommendation assigning a score to the respective second recommendation, the score having an initial value, detecting actions taken by users on the recommendation, updating the score based on the detected actions, and determining that the respective second recommendation satisfies the popularity criteria when the score meets or exceeds a score threshold for the respective second recommendation.

Some embodiments include a system comprising one or more processors and memory storing one or more programs to be executed by the one or more processors. In many embodiments, the one or more programs comprise instructions for determining a plurality of first recommendations from a set of users within a trust network of a first user, wherein each user from the set of users is associated with one of the plurality of first recommendations, determining respective time differences between respective chronologically successive first recommendations of the plurality of first recommendations, and determining one or more second recommendations that satisfy one or more popularity criteria. In some embodiments, the one or more programs further comprise instructions for arranging for display the plurality of first recommendations in a chronologically based order, and one or more of the second recommendations, wherein a respective second recommendation of the one or more second recommendations is inserted between respective chronologically successive first recommendations whose time difference is greater than a threshold.

Various embodiments of systems and methods for recommendation scraping include a method comprising receiving a content feed, wherein the content feed is associated with a holder and identifying at least one post within the content feed comprising a mention of a respective item. In many embodiments, the method can further comprise generating an item recommendation corresponding to the respective item, associating the item recommendation with a profile associated with the holder, and sending instructions to present the item recommendation to one or more users.

Some embodiments include a method comprising receiving a content feed, wherein the content feed is associated with a holder and identifying at least one post within the content feed comprising a mention of a respective item. In many embodiments, the method can further comprise generating an item recommendation corresponding to the respective item and associating the item recommendation with a profile associated with the holder. In some embodiments, the method can further comprise sending instructions to display the item recommendations to one or more users, wherein the holder is within a respective trust network of each of the one or more users.

In some embodiments, a system for recommendation scraping comprises one or more processors and memory storing one or more programs to be executed by the one or more processors. In many embodiments, the one or more programs comprise instructions for receiving a content feed, wherein the content feed is associated with a holder, identifying at least one post within the content feed comprising a mention of a respective item, generating an item recommendation corresponding to the respective item, and associating the item recommendation with a profile associated with the holder.

Various embodiments of methods and systems for providing a collections search include a method comprising determining one or more recommendations from a set of users within a trust network of a first user, wherein each user from the set of users is associated with one of the plurality of first recommendations and determining a category for each of the one or more recommendations. In many embodiments, the method further comprises arranging one or more collections of the one or more recommendations according to the category for each of the one or more recommendations and arranging for display the one or more collections.

In some embodiments, a method comprises determining one or more recommendations from a set of users within a trust network of a first user, wherein each user from the set of users is associated with a different one of the one or more first recommendations and wherein at least one user of the set of users within the trust network of the first user is identified as trusted by the first user based in part on a public profile of a requesting user. In many embodiments, the method can further comprise determining a category for each of the one or more recommendations, arranging one or more collections of the one or more recommendations according to the category for each of the one or more recommendations, and arranging for display the one or more collections to the requesting user.

In many embodiments, a system comprises one or more processors and memory storing one or more programs to be executed by the one or more processors. The one or more programs can comprise instructions for determining one or more recommendations from a set of users within a trust network of a first user, wherein each user from the set of users is associated with one or more first recommendations, and determining a category for each of the one or more recommendations. In some embodiments, the one or more programs can further comprise instructions for arranging one or more collections of the one or more recommendations according to the category for each of the one or more recommendations, and arranging for display the one or more collections.

In accordance with some implementations, a method for obtaining product recommendations is disclosed. The method is performed on a server system having one or more processors/cores and memory storing one or more programs for execution by the one or more processors/cores. The one or more programs include instructions for receiving from a requester a recommendation request. The one or more programs further comprise instructions for determining a first level category, within a hierarchy of categories, associated with the recommendation request. The one or more programs further comprise instructions for presenting the recommendation request to one or more first users within a trust network of the requester. The first users are identified as trusted by the requester with respect to the first level category. The one or more programs further comprise instructions for, if one or more first conditions are satisfied, presenting the recommendation request to one or more second users. Each second user is within a respective trust network of a respective first user and is identified as trusted by the respective first user with respect to the first level category.

In accordance with some implementations, a server system for obtaining product recommendations is disclosed. The server system has one or more processors/cores, and memory storing one or more programs to be executed by the one or more processors/cores. The one or more programs include instructions for receiving from a requester a recommendation request. The one or more programs further comprise instructions for determining a first level category, within a hierarchy of categories, associated with the recommendation request. The one or more programs further comprise instructions for presenting the recommendation request to one or more first users within a trust network of the requester. The first users are identified as trusted by the requester with respect to the first level category. The one or more programs further comprise instructions for, if one or more first conditions are satisfied, presenting the recommendation request to one or more second users. Each second user is within a respective trust network of a respective first user and is identified as trusted by the respective first user with respect to the first level category.

In accordance with some implementations, a non-transitory computer readable storage medium storing one or more programs configured for execution by a server system is disclosed. The one or more programs include instructions for receiving from a requester a recommendation request. The one or more programs further comprise instructions for determining a first level category, within a hierarchy of categories, associated with the recommendation request. The one or more programs further comprise instructions for presenting the recommendation request to one or more first users within a trust network of the requester. The first users are identified as trusted by the requester with respect to the first level category. The one or more programs further comprise instructions for, if one or more first conditions are satisfied, presenting the recommendation request to one or more second users. Each second user is within a respective trust network of a respective first user and is identified as trusted by the respective first user with respect to the first level category.

In accordance with some implementations, another method for obtaining product recommendations is disclosed. The method is performed on a server system having one or more processors/cores and memory storing one or more programs for execution by the one or more processors/cores. The one or more programs include instructions for receiving from a requester a recommendation request. The one or more programs further comprise instructions for determining one or more categories associated with the recommendation request. The one or more programs further comprise instructions for identifying a plurality of candidate recommenders within a predefined number of degrees from the requester within a trust network of the requester. The one or more programs further comprise instructions for scoring the candidate recommenders based on one or more predefined criteria. The one or more programs further comprise instructions for selecting a first number of the candidate recommenders with the best scores. The one or more programs further comprise instructions for presenting the recommendation request to the first number of candidate recommenders.

In accordance with some implementations, another server system for obtaining product recommendations is disclosed. The server system has one or more processors/cores, and memory storing one or more programs to be executed by the one or more processors/cores. The one or more programs include instructions for receiving from a requester a recommendation request. The one or more programs further comprise instructions for identifying one or more categories associated with the recommendation request. The one or more programs further comprise instructions for identifying a plurality of candidate recommenders within a predefined number of degrees from the requester within a trust network of the requester. The one or more programs further comprise instructions for scoring the candidate recommenders based on one or more predefined criteria. The one or more programs further comprise instructions for selecting a first number of the candidate recommenders with the best scores. The one or more programs further comprise instructions for presenting the recommendation request to the first number of candidate recommenders.

In accordance with some implementations, another non-transitory computer readable storage medium storing one or more programs configured for execution by a server system is disclosed. The one or more programs include instructions for receiving from a requester a recommendation request. The one or more programs further comprise instructions for determining one or more categories associated with the recommendation request. The one or more programs further comprise instructions for identifying a plurality of candidate recommenders within a predefined number of degrees from the requester within a trust network of the requester. The one or more programs further comprise instructions for scoring the candidate recommenders based on one or more predefined criteria. The one or more programs further comprise instructions for selecting a first number of the candidate recommenders with the best scores. The one or more programs further comprise instructions for presenting the recommendation request to the first number of candidate recommenders.

In accordance with some implementations, another method for obtaining product recommendations is disclosed. The method is performed on a server system having one or more processors/cores and memory storing one or more programs for execution by the one or more processors/cores. The one or more programs include instructions for receiving from a requester a recommendation request. The one or more programs further comprise instructions for identifying one or more candidate recommenders. The one or more programs further comprise instructions for, for each respective candidate recommender, determining behavior of the respective candidate recommender related to the recommendation request. The one or more programs further comprise instructions for scoring the candidate recommenders based on their respective determined behaviors. The one or more programs further comprise instructions for selecting a number of candidate recommenders with the best scores. The one or more programs further comprise instructions for sending the recommendation request to the selected candidate recommenders.

In accordance with some implementations, another server system for obtaining product recommendations is disclosed. The server system has one or more processors/cores, and memory storing one or more programs to be executed by the one or more processors/cores. The one or more programs include instructions for receiving from a requester a recommendation request. The one or more programs further comprise instructions for identifying one or more candidate recommenders. The one or more programs further comprise instructions for, for each respective candidate recommender, determining behavior of the respective candidate recommender related to the recommendation request. The one or more programs further comprise instructions for scoring the candidate recommenders based on their respective determined behaviors. The one or more programs further comprise instructions for selecting a number of candidate recommenders with the best scores. The one or more programs further comprise instructions for sending the recommendation request to the selected candidate recommenders.

In accordance with some implementations, another non-transitory computer readable storage medium storing one or more programs configured for execution by a server system is disclosed. The one or more programs include instructions for receiving from a requester a recommendation request. The one or more programs further comprise instructions for identifying one or more candidate recommenders. The one or more programs further comprise instructions for, for each respective candidate recommender, determining behavior of the respective candidate recommender related to the recommendation request. The one or more programs further comprise instructions for scoring the candidate recommenders based on their respective determined behaviors. The one or more programs further comprise instructions for selecting a number of candidate recommenders with the best scores. The one or more programs further comprise instructions for sending the recommendation request to the selected candidate recommenders.

In another aspect of the present invention, to address the aforementioned limitations of online commerce, some implementations provide a non-transitory computer readable storage medium storing one or more programs. The one or more programs comprise instructions, which when executed by a server system with one or more processors/cores and memory, cause the server system to perform any of the methods provided herein.

In yet another aspect of the present invention, to address the aforementioned limitations of online commerce, some implementations provide a server system. The server system includes one or more processors/cores, memory, and one or more programs. The one or more programs are stored in memory and configured to be executed by the one or more processors/cores. The one or more programs include an operating, system and instructions that when executed by the one or more processors/cores cause the server system to perform any of the methods provided herein.

In some implementations, a server system is provided for improving the reliability of an Internet-based commerce service through social network based product recommendations using a trust graph that represents trust between a user who wishes to request recommendations for goods or services (hereinafter a "requesting user") and a user who is a candidate to provide a recommendation for those goods or services (hereinafter a "recommending user").

The term "requesting user," as used herein, does not necessarily imply that the requesting user is currently requesting a recommendation. Rather, the requesting user is a user who is participating in a service (e.g., an Internet-based commerce service or social network) in a manner that allows him or her to request recommendations (for example, in accordance with a trust graph). Likewise, the term "recommending user," as used herein, does not necessarily imply that the recommending user is currently issuing (e.g., providing) recommendations. Rather, the recommending user is a user who is participating in a service in a manner that allows him or her to issue recommendations. In some embodiments, a recommending user may be a requesting user in another context. A single user of a service can be simultaneously a recommending user and a requesting user (e.g., both the requesting user and the recommending user are simply users of a service provided by the server system).

In some embodiments, the server system maintains a record of the trust relationships for each user of a plurality of users registered with the commerce service provided by the server system. In some implementations, the server system then uses this information to identify the most trusted recommending users in at least one area of a particular user's trust graph. In some embodiments, the server system maintains or stores the record of trust relationships for each user in a trust graph. In some embodiments, the plurality of users registered with the commerce service comprises a community of users and are each associated with an account or user profile.

In some implementations, the server system receives a trust indication from a requesting user. The trust indication includes information identifying a recommending user. The recommending user is a respective user of a plurality of users registered with the server system. The trust indication also includes a trust level (sometimes called a trust value) that represents a level of trust that the requesting user has for the recommending user. In some implementations, the trust graph is a directed graph, meaning that a particular trust indication indicates only the level of trust that the requesting user has for the recommending user and not the level of trust between the recommending user and the requesting user. As the requesting user sends more trust indications to the server, the directed trust graph for the recommending user includes more trust information and becomes more useful. For example, a requesting user Bob may send three trust indications to the server system, indicating that he trusts Joe, Phil, and Deborah, respectively, each with a high trust level. As described in more detail below, in some embodiments, the indicated trust levels correspond to a particular category of goods and/or services (e.g., "men's formal wear"). The server system stores these trust indications in a directed trust graph for Bob. Because the trust graph is directed, the server system does not infer, based on Bob's trust level toward them, trust levels from Joe, Phil, and Deborah (e.g., when they act as requesting users) toward Bob (e.g., when he acts as a recommending user).

In some implementations, a trust level is represented by a numerical value between 0 and 1, with 0 indicating no trust and 1 indicating maximum trust. In other implementations, the trust level is represented by a numerical value between −1 and 1, in which 1 indicates maximum trust, −1 indicates maximum distrust, and 0 indicates no current trust information. For example, if Jim totally trusts his friend Pam, he would indicate a trust level (e.g., trust value) of 1. For Jim's friend Andy, whom he trusts, but not as much as Pam, Jim would indicate a trust level between 0 and 1, such as 0.5. For a distrusted person, Jim would indicate a trust level below 0 but above −1, such as −0.5. It should be understood, however, that other numerical values and/or ranges of values can be used.

In accordance with some implementations, the server system infers trust information by identifying actions (e.g., behavior) taken by a particular user and determining the trust level indicated by the identified actions. For example, if the server system determines that Jim has received a recommendation for a pair of shoes from Andy, in some embodiments, the server system measures Jim's response to determine a trust level between Andy and Jim. If Jim purchases the recommended pair of shoes, the system determines an increased level of trust from Jim to Andy. If Jim takes no action based on the recommendation, the trust level remains unchanged or, if the server system detects a pattern of ignoring recommendations from Andy, in some embodiments, the trust level is slightly reduced.

In some implementations, each user of the system has a "trustworthiness" score. The trustworthiness score represents an overall rating of the quality and usefulness of a respective user's recommendations. In some embodiments, the trustworthiness score is tied to a particular category of goods and/or services (e.g., a user John may have a high trustworthiness score with respect to men's formal wear and a low trustworthiness score with respect to women's formal wear). In some implementations, the trustworthiness score is represented by a number between 0 and 1. In other implementations, the trustworthiness score is a value with a lower bound of 0, but no upper bound. In yet other implementations, the trustworthiness score can have a negative value. In this case, a respective user's trustworthiness score increases in response to indications that the respective user's recommendations are good. For example, as users of the service choose to buy a product in response to a recommendation from a particular user, the trustworthiness score for the particular user would increase. Correspondingly, recommendations that are ignored or explicitly rejected result in either no change of trustworthiness score or, alternatively, in a lowered trustworthiness score.

In some implementations, a higher trustworthiness score represents a higher level of trustworthiness with respect to recommendations for products (e.g., goods or services). In some implementations, if a user's trustworthiness score exceeds a predetermined level, the user will be noted as a tastemaker or a very influential user.

In some implementations, trust levels are transitive between users. For example, if Jim trusts Pam with a trust level of 1 and Pam trusts Michael with a trust level of 0.75, in some embodiments, the server system calculates a trust level from Jim to Michael. In some implementations, the server system calculates transitive trust by taking the trust level from Pam to Michael and discounting it by a fixed (e.g., predefined) amount. For example, the trust level may be reduced by 5% for each degree of removal from Jim (e.g., each degree away from Jim on Jim's trust graph). For example, in such embodiments, Jim's trust level for Michael is calculated as the product of Jim's trust for Pam, Pam's trust for Michael, and a number corresponding to the reduction for each degree, e.g., $1 \times 0.75 \times 0.95 = 0.7125$. In some implementations, transitive trust values are calculated before a need for such calculated values arises. In other implementations, only direct trust values are stored in the trust graphs and transitive trust values are calculated when required, such as when a request for a recommendation is received by the server system.

In some implementations, transitive trust is calculated through multiple users. For example, user A trusts user B, user B trusts user C, and user C trusts user D. Transitive trust of user A can be calculated for both users C and D, and additionally for any users trusted by users B, C, and/or D. In some implementations, transitive trust is calculated for as many other users and through as many connections as possible. In other implementations, the server system limits the number of connections through which an implicit trust calculation is made. By limiting the number of connections (for example, to no greater than 10 connections) the server system avoids using resources on tenuous connections.

In some implementations, the transitive trust calculations result in more than one possible value of transitive trust from a requesting user to a recommending user. For example, if user A trusts users B and C, and both users B and C trust user D, the value of the implicit trust calculation will depend on whether the connection is made through user B or user C. In some implementations, all possible trust levels are averaged (e.g., using a mean, median, mode, and/or a weighted mean) to determine the implicit trust level. In other implementations, the server system selects either the highest or lowest trust level. In yet other implementations, the server system selects the implicit trust value that relies on the fewest number of connections. In some embodiments, if a plurality of implicit trust values are each calculated using the fewest number of connections (e.g., there exists more than one trust path through the requesting user's trust graph having the fewest number of connections), the multiple trust values are averaged.

In some implementations, an aggregate trust value P is calculated for multiple trust paths by using a probabilistic combination algorithm. As an example of such an algorithm, in some embodiments, a function $P=1-(1-p_1) \times (1-p_2) \times \ldots (1-p_n)$ is used to calculate the aggregated trust level P by using trust values $p_1$ through $p_n$, each of which represent a trust level from a plurality of different trust paths. For example, if one path gives a trust value of 0.8 and another gives a trust value of 0.63, the aggregate trust level according to this approach is calculated as $1-(1-0.8) \times (1-0.63)=0.926$. This function can be used for an arbitrary number of different trust paths.

In some implementations, a trust indication from a requesting user to a recommending user indicates a specific category in which the indicated trust level applies. For example, Bob may trust Alice at a high level in one category of product, such as consumer electronics, but trust Alice at a lower level for a second type of product, such as men's shoes. Thus, when the requesting user submits a trust indication of a trust level for the recommending user, in some embodiments, the trust indication includes a category of products or services for which the trust level applies. In this way, the trust graph can include different trust levels for different categories of products. In some implementations, the different categories are arranged in a hierarchy of categories. In some implementations, the highest hierarchical level is a general level (e.g., indicating a general level of trust in a user) and there are a plurality of sub-levels underneath the general level. For example, the plurality of sub-levels can includes levels such as "fashion," "electronics," and "media," among others. Each sub-level can be a parent sub-level having one or more child sub-levels underneath it, unless the sub-level is a leaf node of the hierarchy of categories (e.g., a sub-level has a genus-species relationship with respect to its child sub-levels). For example, the sub-level "fashion" could include child sub-levels for "women's wear," "men's wear," and "kid's wear."

In some implementations, the server system propagates trust levels from a sub-level to higher hierarchical levels (e.g., more general categories in the hierarchy of categories, also called "parent sub-levels" or "parent categories") and/or to lower hierarchical levels (e.g., more specific categories in the hierarchy of categories, also called "child sub-levels" or "child categories"). In some implementations, trust levels are passed to (e.g., inherited by) child categories without alteration, but trust levels are discounted when passed to parent categories in the hierarchy. For example, Jim trusts Andy with a trust level of 0.5 in the category "shoes." That trust level is propagated to lower, more specific categories, such as "athletic shoes" or "formal shoes," without discount. However, when the trust level is propagated to a higher category, such as "fashion," the trust level is discounted by a fixed amount (e.g., 10%). Thus, in this example, the graph determines that Jim trusts Andy with respect to "fashion" at the level of 0.45 (e.g., the discounted trust level is calculated as $p(1-r)$, where p is the trust level for the child sub-level and r is the fixed amount by which the trust level for the child sub-level is reduced when calculating a trust level for a parent sub-level). In some embodiments, trust levels are discounted in an analogous manner when passed to lower, more specific categories.

In some implementations, the server system uses the gathered trust information to improve a user's experience (UX). The server system allows a requesting user to request recommendations for goods and services that the requesting user is interested in purchasing. The server system uses the stored trust graphs to identify trusted potential recommending users. The server system receives a request for a recommendation from a requesting user. The request for recommendation includes a category of goods or services that defines the type of recommendation the requesting user wants. The server system uses the trust graph associated with the requesting user, among other factors, to determine one or more candidate recommending users from whom to request a recommendation and/or in the same or different embodiment, provide to the requesting user a previous recommendations from one or more candidate recommending users.

In some implementations, when a user registers with the server system to participate in the online commerce system, the user has little or no trust information regarding other users. The server system can collect user information from other social networks (Facebook, Twitter, LinkedIn, etc) or from Gmail/webmail address books to identify other users of the server system that the new user might wish to trust. The server system then displays trust recommendations to the user. In some implementations, the server system accesses the social network information (and/or Gmail/webmail address book information) only with the express permission of the user. In some implementations, the server system gathers demographic information from the new user and uses that demographic information (e.g., user age or age range, geographical location, income level, education level) to determine recommended products and other users that the potential new user may wish to trust.

In some implementations, the server system uses the social network and demographic information gathered from external sources, as described above, to determine recommendations from the user's social network prior to receiving adequate trust level information from the user. In some implementations, the server system uses general product popularity data to find recommendations for users without sufficient trust information. General product popularity data is data that describes how popular particular products are within their product category (e.g., in the hierarchy of categories). In other implementations, the server system uses direct editorial control (e.g., an editor selecting specific recommendations) to supply recommendations prior to receiving adequate trust level information from the user.

In some implementations, the server system will identify one or more users not already trusted by a requesting user (user A) that the server system has determined are likely to be trusted by the requesting user. In some implementations, the server system identifies the one or more users by finding connections or similarities between the one or more users and the requesting user. For example, if multiple users trusted by the requesting user all trust a particular other user (e.g., a particular person), the server system determines that the requesting user will likely trust the other user. In other implementations, the server system identifies one or more users that have similar identified interests as the requesting user or have recommended similar products to those recommended by the requesting user. In yet other implementations, the server system identifies one or more users likely to be trusted by the requesting user using social connection information from a third-party website or service, interactions that the users have had with the server system, and any other information the server system has with regard to the users.

In some implementations, the server system identifies a particular category in which the requesting user is likely to trust the one or more users. In some implementations, the server system identifies one or more users likely to be trusted by the requesting user in response to a request from the requesting user for recommendations of users to trust. In some implementations, the server system transmits the identified one or more users to the requesting user for display. In some implementations, the server system also transmits information describing the reasons why the server system selected a particular user. Variously, the information can be automatically (e.g., concurrently) displayed with the recommendation or displayed at the request of the requesting user. For example, the server system transmits a recommendation for Bob to trust Ernie and includes the fact that Ernie was identified because three people trusted by Bob (Alice, Carol, and Dan) also trust Ernie.

In some implementations, the one or more identified users are recommended only in a particular category. In response to receiving a recommendation to trust a recommending user in a specific category, the requesting user can choose to trust the user only in the recommended category, trust the user in a narrower/lower category than the recommended category, or trust the user in a broader/higher category than the recommended category. For example, the server system recommends that Bob trust Ernie in men's formal clothes. Bob has the option of trusting Ernie in only men's formal clothes, in a narrower category (e.g., a child category) such as men's belts, or a broader category (e.g., parent category) such as menswear. In some implementations, the requesting user can request to view public information about an identified recommending user while determining whether to trust the user or not. In some implementations, the requesting user can only see information that the identified user has explicitly marked as public. For example, Ernie may have made public his recommendations in menswear, and Bob can view the recommendations as part of his decision as to whether or not to trust Ernie.

In accordance with some implementations, in response to receiving a request for a recommendation, the server system determines a list of users in the requesting user's trust graph that have trust levels in the category requested by the user. The server system ranks the one or more users in order of trust level. In some implementations, the client system calculates transitive trust values for users with whom the requesting user does not have a direct trust level and includes at least some of these users in the list. Transitive trust values may also be pre-calculated and stored in the server system. When a server system receives a request for a recommendation, the server system determines whether additional transitive trust values need to be calculated. In some implementations, only some transitive trust values are pre-calculated and others are calculated as needed. For example, in some embodiments, only first-order transitive trust values are pre-calculated and all other transitive trust values are calculated as needed. First-order transitive trust values are trust values that have only one indirect trust link. For example, if Bob directly trusts Alice and Cody, then the first-order transitive trust values are calculated for users directly trusted by Alice and Cody.

In some implementations, the server system also includes (e.g., in the list) users who are designated as highly influential users over the entire system (or large portions of the system) for the requested category. For example, if Bob is highly trusted by a significant portion of registered users and has a high number of successful recommendations, Bob may be designated as a highly influential user with respect to a specific category.

In some implementations, the server system then selects a number of users to be included on the list. In some implementations, this number is a predetermined number, such as three. In other implementations, this number includes all the users above a certain trust level. In yet other implementations, this number is a variable number depending on a variety of factors, such as the number of recommendations already requested and the number of previous recommendations that have been accepted. For example, the server system may order 20 users ranked from highest to lowest trust. The server system then determines the three most highly trusted users that have not had a recommendation request within the last two days. In this way, the server system avoids flooding users with too many requests for recommendations. In the same or different embodiments, the server system can provide incentives or rewards to the recommending users for responding to the requests for recommendations to motivate the recommending users to respond. Similarly, the server system can monitor whether the recommending users respond to the requests for recommendation, and can send fewer or no requests to particular recommending users if the particular recommending users do not respond to the requests in a timely manner or at all regardless of how highly ranked the particular recommending users are. After a predetermined or other time period, the server system can reset and resume sending the normal quantity of requests for recommendations to the particular recommending users.

In some implementations, the server system sends a message to the selected users, requesting a recommendation in the selected category. The message can be sent over any communication medium available to the user, including, but not limited to, email, text message, Twitter, Facebook message/post, voicemail, social media instant message, and/or a messaging service internal to the server system. The server system then waits a predetermined amount of time. In some implementations, the predetermined amount of time is standard across the entire system. In other implementations, the predetermined amount of time is determined in accordance with one or more urgency characteristics of the request.

As an example of an urgency characteristic of the request, in some implementations, when submitting a request, the requesting user indicates a time frame in which he or she wants the request for a recommendation to be fulfilled. The server system selects a predetermined amount of time such that any recommendations will be received before the end of the indicated time frame. For example, the requesting user emails a request for a recommendation for a smart phone to the server system and indicates he would like a recommendation within 24 hours. The server system then determines an appropriate period of time, such as eight hours, to wait for recommendations. If a recommendation is not received within eight hours, the server system takes action to ensure that recommendations are received within the 24 hour period (e.g., by sending a request for a recommendation to additional users).

In accordance with some implementations, when the predetermined amount of time has passed, the server system determines whether any recommendations have been returned. Such returned recommendations can be received by the server system through any form of communication available to the recommending user. For example, if the request for a recommendation is sent to the user through his email service, the user may reply directly to the email or choose another communication method, such as a text or voice message, to return a recommendation. The server system maintains a list of any pending requests for recommendations for each user. When a user logs onto the server system, the server system notifies the user about whether there are any pending requests for recommendations. In some implementations, the user can submit recommendations through a server system interface (e.g., a graphical user interface provided by the server system to the user on a browser at the user's client device). In some implementations, the server system rewards users who submit recommendations in response to requests for recommendation within the predetermined time.

In some implementations, if one or more recommendations have been received from recommending users, the server system selects at least one of the recommendations to forward to the requesting user. In some implementations, the server system selects the recommendation from the user with the highest trust level. In other implementations, the server system selects at least one recommendation to send to the requesting user based on a number factors, including but not limited to, the overall popularity of the recommended items, the recommendation history of the recommending user, the brand preferences of the requesting user, and the price preferences of the requesting user. In some implementations, the server system requests a large number of recommendations in response to a request (e.g., more than would normally be needed to fulfill a request for recommendations) and uses the extra recommendations to build a database of user recommendations.

In some implementations, when the predetermined amount of time has passed, in accordance with a determination that no users have responded to the request for recommendations, the server system selects additional users to whom it sends a request for a recommendation. In some embodiments, additional requests are sent out before the predetermined amount of time has expired.

In some implementations, the server system identifies a list of previously received recommendations in the requested category. The server system ranks the list of previously received recommendations based on a number of factors, including but not limited to, the trust level the requesting user has for the user who submitted the recommendation, the brand and price preferences of the user, the overall popularity of the item, how long ago the recommendation was made, and how other users have responded to the recommendation. For example, if after four hours no recommendations have been received from the users who had been contacted by the server system, the server system can choose another set of potential recommending users and/or review previously recommended items in the relevant category for appropriate recommendations for the user. In this way, the server system can guarantee recommendations within the time frame requested by the user.

In accordance with some implementations, the server system sends one or more recommendations to the requesting user. The requesting user may respond to the recommendation with a purchasing intent indication. In response to receiving a purchase intent indication from the requesting user, the server system purchases the recommended product on behalf of the requesting user. In some implementations, the server system does not purchase the product or service on behalf of a user. Instead, the server system facilitates a product purchase with a third-party and sends the user a link or other information to allow the user to purchase the goods or services themselves. In other implementations, employees associated with the server system manually purchase the product or service and arrange for delivery to the user. In some implementations, the server system monitors the requesting user's purchasing decisions. When the requesting user purchases a recommended product, the server system responds by increasing the trust level between the requesting user and the recommending user who supplied the recommendation. Consider an example in which Bob recommends a particular smart phone to Alice. If Alice buys the smart phone based on Bob's recommendation, the server system will increase the trust level from Alice to Bob. As noted above, in some implementations, Alice's trust level for Bob will not be increased but Bob's overall trustworthiness score is increased. In the same or different embodiments, if Alice subsequently returns the product because she did not like the product, the server system will decrease the trust level from Alice to Bob back to the previous level or to a lower level, and/or Bob's overall trustworthiness score is decreased to his previous level or to a lower level.

In some implementations, the user can rate the purchased product. In some embodiments, when a user rating of a purchased product is identified, the server system uses that information to update trust information. For example, if Alice submits a good review of the smart phone she purchased, the server system will both update Alice's product preferences and also increase her trust level for the user who recommended the smart phone. However, if Alice submits a bad review for the smart phone she purchased, the server system will decrease her trust level for the user who submitted the recommendation, and/or the server system will decrease the overall trust level for the user who submitted the recommendation.

In some implementations, the user that supplied the recommendation is rewarded by the server system and the overall influence ranking of the user increases for the category of the recommended product. Consider an example in which Jim requests recommendations for a new laptop. The server system determines the top 10 potential recommending users and sends them each an email notifying them of the requested recommendation. Dwight, Pam, and Michael all respond with laptop recommendations. Of the three recommendations, the server system selects Pam's and Dwight's recommendations as being the most relevant and forwards those recommendations to Jim. Jim responds by indicating he would like to purchase the laptop recommended by Dwight. As a result, the server system increase Jim's trust level for Dwight in the category of laptops and increases Dwight's trustworthiness score in that category as well. In some implementations, Dwight also receives a reward/compensation from the server system. In some implementations, a recommending user receives a reward/compensation from the merchant who sold the item. In some implementation, the reward is monetary. In some implementations, the reward includes loyalty program points (e.g., the user is rewarded with miles for an airline's frequent flier program) and/or from the requesting user who purchase the product or service based on the recommendation of the recommending user.

In some implementations, the server system prepares recommendations for users without a direct request from the user. When the user interacts with the service provided by the server system, such as visiting the webpage associated with the server system, the server system presents one or more recommendations to the user. In some implementations, the server system first determines one or more categories of interest to the user visiting the web page. The server system determines categories of interest to the user by information stored in the user's profile concerning, among other things, buying patterns, recent requests, searches, viewing history, brand preferences, time and date information, information stored about the other users connected to the user, prior product reviews by the user, prior professional reviews by third-parties, and overall trends within the community associated with the server system. For example, if a user has recently been searching for "iPhone 5S" and "Samsung Galaxy 3," and a friend whom he trusts has recently purchased a "Nokia Lumia 920," the server system will determine that the user is interested in the category "smart phone."

In accordance with some implementations, the server system determines recommendations for the one or more categories determined to be of interest to the user visiting the webpage. For each category determined to be of interest to the user, the server system identifies recommendations for that category in the trust graph of the user. The server system ranks each identified recommendation based on a trust level associated with the user who made the recommendation, the preferences of the requesting user, the popularity of the product, and opinions of highly influential users, among other criteria. In some implementations, the system identifies all recommendations in a category. In some implementations, the system identifies some recommendations in a category, which can be either a predetermined number or a dynamically changing number of recommendations.

In some implementations, the server system determines a list of recommendations that match a particular category. The server system retrieves this list from a database of stored recommendations. Once the list has been retrieved, the server system ranks the list of potential recommendations in accordance with trust information stored in the trust graph. In some implementations, the potential recommendations are also ranked in accordance with other factors, such as overall product popularity, price, and user preferences.

In some implementations, the server system displays the recommendations to the requesting user in ranked order from most relevant to least relevant. In some implementations, the displayed recommendations are ranked in accordance with other factors, such as price or product popularity. In some implementations, the server system also displays pictures or symbols representing the recommending users on or near the images representing the recommended items. In some implementations, a requesting user of the server system can request a description of the recommendation source (e.g., a description of why the server system has delivered a specific recommendation to the requesting user). In some implementations, a recommendation from the server system is from a recommending user directly trusted by the requesting user. When the requesting user requests a description of the recommendation source, the server system displays information identifying the recommending user as the source (e.g., the recommending users name and/or a profile picture of the recommending user). For example, if Jake trusts Alan and receives from Alan a recommendation for a pair of shoes, in some implementations, the displayed recommendation includes a displayed recommendation score and a description that includes Alan's name and an indication that Jake directly trusts Alan.

In some implementations, a recommendation is from a recommending user not directly trusted by the requesting user, but for whom the server system has calculated an implicit trust level. In some embodiments, when the requesting user requests a description of the recommendation source, the server system displays an implicit trust chain. The implicit trust chain is a representation of the connections necessary to generate the implicit trust level. For example, when user A directly trusts user B, user B directly trusts user C, and user C directly trusts user D, an implicit trust chain is constructed from user A to user D and is displayed as A→B→C→D. Thus, when a requesting user requests a recommendation source, the server system displays the associated implicit trust chain. In some implementations, more than one possible implicit trust chain exists (more than one path from A to D) and the server displays the shortest implicit trust chain or the trust chain with the highest score.

In some implementations, the server system only displays a portion of the total implicit trust chain. For example, if the implicit trust chain is so long that it cannot easily be displayed, the server system displays only the first and last few connections in the implicit trust chain. In some implementations, the server system displays only the first connection in the implicit trust chain (e.g., a person that the requesting user trusts directly) and a numeric representation of the number of connections (sometimes called the number of degrees) in the chain (e.g., when the trust chain between a user A and a user D is A→B→C→D, user D is said to be a third-degree connection within the user A's trust graph). For example, if Frank receives a recommendation that is the result of a 10 person implicit trust chain that starts with John (e.g., John is directly trusted by Frank), in various embodiments, the system displays all 10 connections, displays the first two and last two connections in the chain, or displays only the identity of John, the first link in the chain (and optionally a number of degrees of the trust chain).

FIG. 1 is a block diagram illustrating a client-server environment 100 for the commerce service in accordance with some implementations. The client-server environment 100 includes one or more client systems 102 (e.g. 102-1 and 102-2), a server system 120, and one or more vendors 160, all connected over one or more networks 110. In some implementations, the client system 102 includes one or more client applications 104 and a display 106. The server system 120 includes a communication module 122, a recommendation request module 124, a user interface module 126, a purchasing module 128, and a trust calculation module 130, a product database 140, a recommendation database 142, and a user profile database 150. The network 110 may be any of a variety of networks, including local area networks (LAN), wide area networks (WAN), wireless networks, wired networks, an intranet, the Internet, or a combination of such networks.

In accordance with some implementations, the one or more client applications 104 include, but are not limited to, a web browsing application (e.g., a web browser) for connecting to the server system 120.

In some implementations, the display 106 is integrated directly into the client system 102 (e.g., as is the case with client system 102-1, which can be a laptop, smart phone, tablet computer, smart television, or the like). In other implementations the device is connected to, but not integrated into, the client system (e.g., as is the case with client system 102-2, which can be a desktop computer that connects to a stand-alone display either wirelessly or otherwise).

In some implementations, the client system 102 sends a trust indication 114 to the server system 120. The trust indication 114 identifies a requesting user of a plurality of users registered with the server system 120, a recommending user of the plurality of users registered with the server system 120, and a trust level from the requesting user to the recommending user. In some implementations, the indicated trust level is represented by a numerical value between 0 and 1, with 0 indicating no trust and 1 indicating maximum trust. In other implementations, the trust level is represented by a numerical value between −1 and 1, wherein 1 indicates maximum trust, −1 indicates maximum distrust, and 0 indicates no current trust information. For example, the client system 102 calls a function such as Trust(A, B) which establishes trust from user A to user B. A more sophisticated trust function would include the product category and would be invoked by calling Trust(A, B, Category) to establish a trust from user A to user B with regard to a given category. In some implementations, user functions are unique to each user and include a trust level. For example a trust function associated with user A and including a trust level is Trust_A (B, "Shoes", 0.5). The server system 120 uses the received trust indication 114 to build a trust graph associated with the requesting user.

In some implementations, the client system 102 sends the server system a recommendation request 112 for a product (e.g., goods or services). In some embodiments, the recommendation request 112 is from a requesting user associated with the client system 102 and indicates a category of goods or services for which the requesting user would like a recommendation. In some implementations, the server system 120 uses trust information stored in the requesting user's trust graph to identify one or more potential recommending users from the plurality of users associated with the server system 120. In some implementations, the server system 120 sends requests to the client system 102 of a recommending user registered with the server system 120 for appropriate recommendations in response to the request. The client system 102 of the recommending user receives the server system 120's recommendation requests 112.

In some implementations, the recommending user responds to the recommendation request 112 by selecting goods or services to recommend. The client system 102 of the recommending user then transmits a recommendation 118 (e.g., product recommendations) to the server system 120. The recommendation 118 sent from the client system 102 of the recommending user to the server system 120 is a recommendation for a product in the same category as originally requested by the requesting user. The server system 120 receives one or more recommendations 118 and determines one or more recommendations 118 to send to the requesting user.

In some implementations, the client system 102 of the requesting user receives one or more recommendations 118 from the server system 120. The client system 120 of the requesting user displays the one or more recommendations 118 to the requesting user. In some implementations, when the requesting user selects one of the displayed recommendations 118, the client system 102 transmits a purchase decision 116 to the server system 120.

In accordance with some implementations, the server system 120 includes a communication module 122, a recommendation request module 124, a user interface module 126, a purchasing module 128, a trust calculation module 130, a product database 140, a recommendation database 142, and a user profile database 150. The communication module is configured to send and receive communication over the network 110 to one or more client systems 102 and one or more vendors 160.

In accordance with some implementations, the recommendation request module 124 is configured to receive a recommendation request 112 from a client system 102. The recommendation request 112 includes information identifying the requesting user, the category of product or services for which a recommendation is desired, a time frame for receiving a recommendation, a price range for the recommended product, a number of desired recommendations, and any other parameters specified by the requesting user. The recommendation request module 124 uses the data included in the recommendation request 112 to determine a list of one or more potential recommending users from the plurality of users.

In some implementations, the recommendation request module 124 determines a list of potential recommending users by analyzing the trust graph of the requesting user to identify users whom the requesting user trusts in the requested category. The list of potential recommending users includes a determined number of recommending users. In some implementations, the determined number of recommending users is predetermined by the server system 120. In other implementations, the determined number of recommending users is determined by the recommendation request 112 of the requesting user. In yet other implementations, the determined number of recommending users is determined dynamically based on the number of suitable candidates, the number of recommendation requests 112 received from the particular requester, and the category of product requested.

In some implementations, the recommendation request module 124 identifies the users directly trusted by the requesting user and selects the users most highly trusted, either generally or in the specific category requested. If there are not enough directly trusted users identified, the recommendation request module 124 requests that the trust calculation module 130 calculate indirect trust with users for whom the requesting user may have transitive trust or conveyed trust. Transitive trust is determined by inferring at least some trust on the part of a requesting user based on the trust relationships of the users trusted by the requesting user. Transitive trust is discussed in more detail below.

In some implementations, the directly trusted users and the indirectly trusted users may be insufficient to reach the number of potential recommending users required. In some implementations, the recommendation request module 124 also includes users who are "highly influential" in the requested category. In some implementations, the server system 120 removes users from the list of potential recommending users to avoid flooding certain users with an unreasonable amount of recommendation requests from the server system 120. By limiting the number of recommendation requests to any particular user, the server system 120 avoids flooding or burning out the recommending user. In some implementations, users are able to determine the frequency at which they receive requests for recommendations. For example, a user can establish that he or she will receive no more than two recommendations per month.

In some implementations, the recommendation request module 124 employs the communication module 122 to send a recommendation request 112 to each user in the identified list of potential recommending users. The communication module 122 then receives recommendations from one or more client systems 102 associated with one or more users in the identified list of potential recommenders. The recommendation request module 124 then selects one or more of the received recommendations to send to the client system 102 of the requesting user.

In some implementations, the user interface module 126 is configured to arrange a web page associated with the server system 120 such that, when requested by a client system 102 associated with a user, the web page includes recommendations customized to the requesting user. The user interface module 126 determines categories of interest to the user based on the user's profile, previous purchases, search history, viewing history, prior product reviews, prior product recommendations, and user profiles of users they trust, among other factors. The user interface module 126 determines recommendations for one or more of the determined categories by identifying recommendations made by users trusted (e.g., by the requesting user) with respect to those categories. In some implementations, the identified recommendations are combined with traditional search results. Any method of searching products in response to a search query can be used to produce traditional search results.

In some implementations, the user interface module 126 ranks the recommendations by the trust level the requesting user has with the recommending user (either direct or indirect trust), the overall popularity of the product recommended, the amount of time passed since the time the recommendation was made, professional reviews, prior purchasing decisions, prior product reviews, prior recommendations, and other factors included in the requesting user's preferences, such as price, size, color, materials, features, product availability, shipping preferences, and/or brand. The user interface module 126 configures the web page to display categories ranked in order of determined interest to the requesting user, with higher ranked categories being of more interest than lower ranked categories.

In some implementations, the user interface module 126 orders recommendations within a particular category on the web page by the predicted interest of the user such that the higher a product is ranked in accordance with the predicted interest of the user, the sooner the recommendation is displayed. In some implementations, products receive a ranking score based on predicted interest of the user and are ordered based on the ranking score. In some implementations, the user interface module 126 configures the web page to display the recommendations as an image of the recommended product. In some implementations, the user interface module 126 includes an image of the recommending user on top of or near the image of the recommended product.

In some implementations, the purchasing module 128 is configured to receive a purchase decision 116 from a client system 102. Based on this message, the purchasing module 128 determines the product to be purchased and identifies the relevant vendor in the products database 140. The purchasing module 128 then enlists the communication module 122 to purchase the desired product from one of the vendors 160 available over the network 110.

In some implementations, the trust calculation module 130 is configured to build and maintain trust graphs for each user registered with the server system 120. In some implementations, the trust calculation module 130 receives a trust indication 114 from a client system 102 associated with a requesting user. The trust indication 114 includes information identifying the requesting user, a recommending user, and a trust level from the requesting user to the recommending user. As noted above, the trust level is a numeric value indicating the level of trust between the two users. The trust calculation module 130 builds trust graphs by collecting a plurality of trust indications 114 for each user registered with the server system 120.

In some implementations, the trust calculation module 130 updates a requesting user's trust graph based on the requesting user's interactions with the server system 120, interactions with others, and purchasing decisions. For example, if a requesting user buys a product that has been recommended by a recommending user, the trust calculation module 130 will infer that the requesting user trusts the recommending user and will increase the trust level to reflect the inference of greater trust.

In some implementations, the product database 140 contains information for products that may be purchased through the server system 120. In some implementations, the products in the product database 140 are added by vendors 160 (who may be partnered with the service provided by the server system). In some implementations, the products in the database 140 are added by users and recommenders in the server system 120. The products database 140 includes information for each product, including, but not limited to, the price of the product, its specification (e.g., size, color), shipping options/price, and the vendor(s) 160 from which it is available. In some implementations, the client system 102 sends a purchase decision 116 to the server system 120 and the purchasing module uses the information stored in the product database 140 to purchase the selected product.

In some implementations, the recommendation database 142 stores recommendations received from users of the server system 120. In some implementations, the recommendation database maintains a list of all recommendations ever made by any users of the database, an indication of how successful those recommendations were (e.g., what percentage of users purchased the recommended product when given this recommendation), and information concerning the request for recommendation that prompted the recommendation. In other implementations, only a portion of the total recommendations are retained in the recommendation database 142 at any given time, e.g., based on how long ago the recommendation was made, whether the product is still available, the trustworthiness of the recommending user, how popular the recommendation has been, etc.

In some implementations, the recommendation request module 124 receives a recommendation request 112 from a user. In response, the recommendation request module 124 queries the recommendation database for any stored recommendations that meet the requested criteria. The recommendation database 142 then returns a list of potential recommendations to the recommendation request module 124. The recommendation request module then orders the potential recommendations by the trust level of the requesting user for the recommending user. The server system 120 selects a predetermined number of recommendations from the top of the ordered list and displays the selected recommendations to the requesting user. In some implementations, the server system 120 allows the user to navigate through the ordered list to view recommendations that were not initially selected by the server system 120. For example, in some implementations, the server system 120 provides affordances (e.g., a scroll bar, a "next" button) through which the user can navigate through the ordered list. In some embodiments, server system 120 displays scrollable list of recommendations from recommendation database 142 to the requesting.

In some implementations, the user profile database 150 contains user profiles for users who have registered to use the service provided by the server system 120. In some implementations, a user profile includes a user's name, contact information, identification, demographic information (e.g., gender, age, location), purchasing history, shipping preferences, social network information, and trust information. The user profile database 150 includes trust graph data 152.

In some embodiments, the user profile 150 includes an indication signifying whether the user is "burnt-out," meaning that no further recommendation requests should be asked of her until she is no longer "burnt-out." In some embodiments, the user is identified as burnt-out when the user has received a predefined number of recommendations request with a predefined amount of time (e.g., two requests within the past 24 hours). In some embodiments, the user can self-identify as burnt-out by setting a "burnt-out" status in her own user profile 150, in which case the system will not request recommendations as long as the user maintains the burnt-out status.

In some implementations, user profile information 150 also includes the trust graph database 152 includes information describing a plurality of directed trust graph. In some embodiments, trust graph database 152 includes a trust graph for each of the users who have registered to use the commerce service provided by server system 120. The trust graph includes nodes, which represent users, and edges connecting nodes, which represent the trust level between the two users represented by the two nodes that the edge connects.

In some implementations, the vendors 160 are commercial organizations with products to sell. In some embodiments, the vendors 160 receive product orders from the server system 120 and fulfill those orders.

Figure 2:
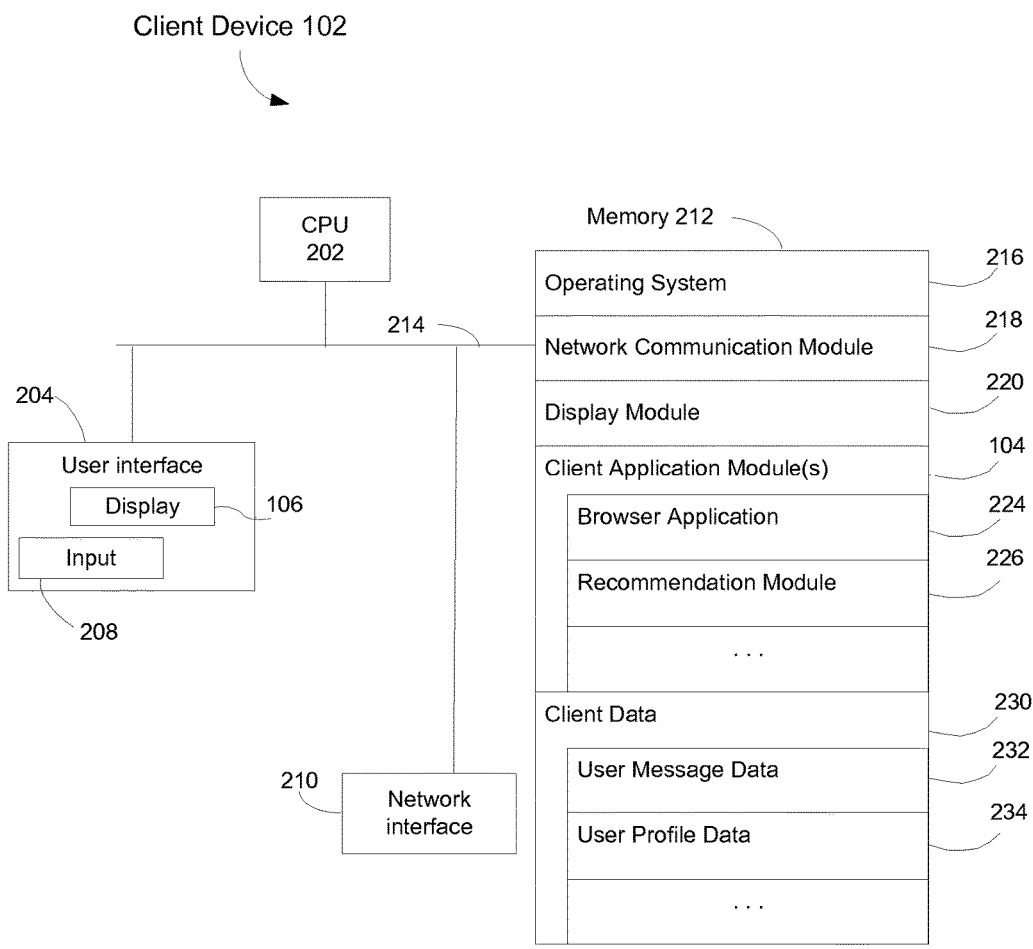
FIG. 2 is a block diagram illustrating a client system in accordance with some implementations.

FIG. 2 is a block diagram illustrating a client system 102, in accordance with some implementations. The client system 102 typically includes one or more processing units or cores (collectively "CPUs") 202, one or more network interfaces 210, memory 212, and one or more communication buses 214 for interconnecting these components. The client system 102 includes a user interface 204. The user interface 204 includes an associated display device 104 and optionally includes an input means such as a keyboard, mouse, a touch sensitive display, or other input buttons 208. Optionally, the display device 106 includes an audio device or other information delivery device. Furthermore, some client systems use a microphone and voice recognition to supplement or replace the keyboard.

Memory 212 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 212 may optionally include one or more storage devices remotely located from the CPU(s) 202. Memory 212, or alternately the non-volatile memory device(s) within memory 212, includes a non-transitory computer readable storage medium. In some implementations, memory 212 or the computer readable storage medium of memory 212 stores the following programs, modules and data structures, or a subset thereof:

- an operating system 216 that includes procedures for handling various basic system services and for performing hardware dependent tasks;
- a network communication module 218 that is used for connecting the client system 102 to other computers via the one or more communication network interfaces 210 (wired or wireless) and one or more communication networks, such as the Internet, other wide area networks, local area networks, metropolitan area networks, and so on;
- a display module 220 for enabling display of media on a display 106 associated with the client system 102;
- one or more client applications module(s) 104 for enabling the client system 102 to perform the functions offered by the client system 102, including, but not limited to:
  - a browser application 224 (or another local application, such as a mobile application or mobile "app") for sending requests to a server system (FIG. 1, 120) and displaying the information (for example web pages) returned by the server system (FIG. 1, 120) or a smart phone app that performs the same function;

a recommendation module 226 for enabling a user to send a recommendation requests to a server system (FIG. 1, 120), receiving a message requesting a recommendation from another user from the server system (FIG. 1, 120), and to select a goods or services to recommend to another user and transmit the recommendation information to the server system (FIG. 1, 120); and a client data 230 for storing data (e.g., in a database) related to the client system 102, including but not limited to:

client message data 232, including data representing messages to be sent to the server system (FIG. 1, 120) and messages received from the server system (FIG. 1, 120); and user profile data 234, including information concerning users of the client system 102 such as a user profile, user preferences and interests, and other information relevant to providing services to the user. In some embodiments, the information can comprise the user's name and contact information, identification, demographic information (e.g., gender, age, location, etc), user history (e.g., previous purchases, searches, page views, previous product recommendations, previous product reviews, and so on), social network information, trust information, shipping preferences, personal measurements.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, memory 212, optionally, stores a subset of the modules and data structures identified above. Furthermore, memory 212, optionally, stores additional modules and data structures not described above.

Figure 3:
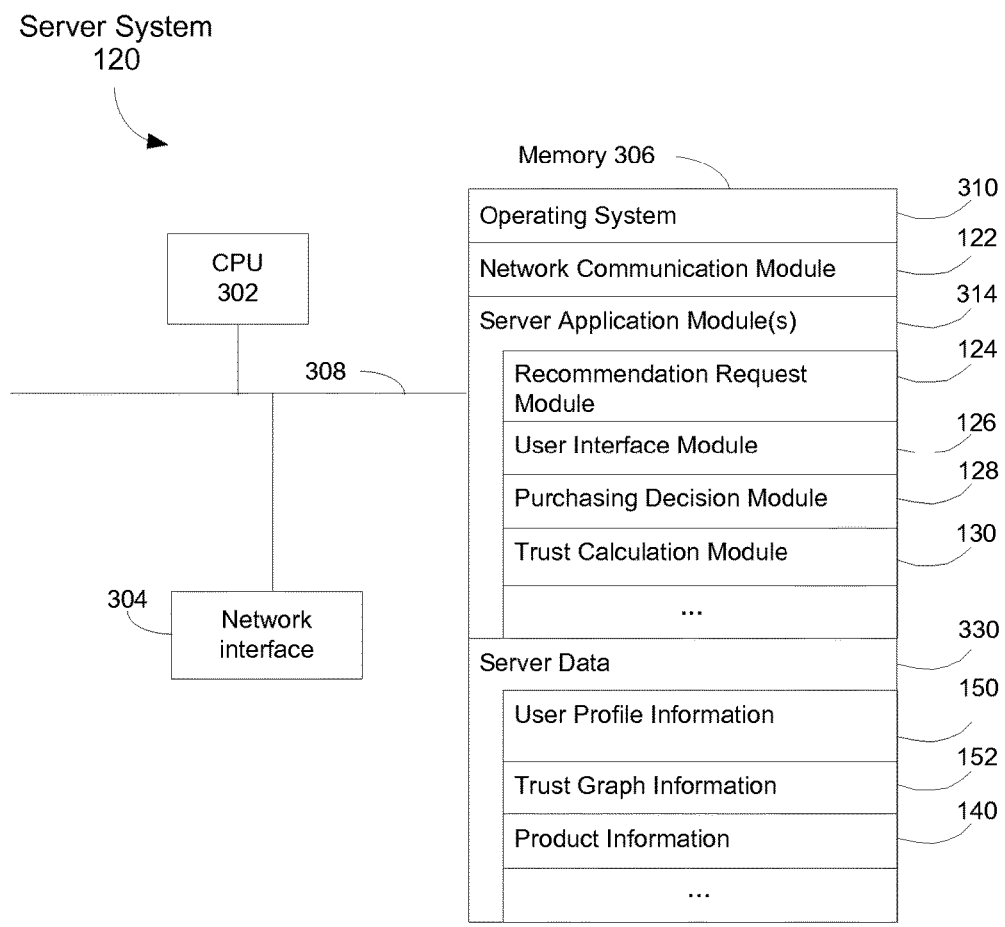
FIG. 3 is a block diagram illustrating a server system in accordance with some implementations.

FIG. 3 is a block diagram illustrating a server system 120, in accordance with some implementations. The server system 120 typically includes one or more processing units or cores, CPUs 302, one or more network interfaces 304, memory 306, and one or more communication buses 308 for interconnecting these components.

Memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the CPU(s) 302. Memory 306, or alternately the non-volatile memory device(s) within memory 306, includes a non-transitory computer readable storage medium. In some implementations, memory 306 or the computer readable storage medium of memory 306 stores the following programs, modules and data structures, or a subset thereof:

an operating system 310 that includes procedures for handling various basic system services and for performing hardware dependent tasks;

a network communication module 122 that is used for connecting the server system 120 to other computers via the one or more communication network interfaces 304 (wired or wireless) and one or more communication networks, such as the Internet, other wide area networks, local area networks, metropolitan area networks, and so on;

one or more server application module(s) 314 for enabling the server system 120 to perform the functions offered by the server system 120, including but not limited to:

a recommendation request module 124 for receiving a recommendation request from a requesting user, determining potential recommending users using the trust graph information associated with the requesting user, sending a request for recommendations to the determined potential recommending users, receiving one or more recommendations from the determined potential recommending users, and sending one or more of the received recommendations to the requesting user;

a user interface module 126 for configuring the information displayed at the client system when the client system (FIG. 1, 102) requests a web page from the server system 120;

a purchasing decision module 128 for receiving a purchasing decision 116 from a client system (FIG. 1, 102) that indicates a user's intention to purchase a goods or services through the server system and for purchasing the goods or services from one of the vendors (FIG. 1, 160); and a trust calculation module 130 for storing trust indications received from client systems (FIG. 1, 102), using the stored trust indications to build a directed trust graph, and identifying the trust level between two users based on the stored trust data; and one or more server data module(s) 330 for storing data related to the server system 120, including but not limited to:

user profile information database 150 including user personal information, preferences and interests, user history, including past user purchases, searches, page views, previous product recommendations, previous product reviews, and social connections of the user;

trust graph information 152 including information describing trust between users of the server system 120 including data indicating the categories in which users trust each other; and product information 140 including information contains information for products that may be purchased through the server system 120, including, but not limited to, the price of the product, its features (size, color, etc), and the vendor or vendors from which it is available.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, memory 306, optionally, stores a subset of the modules and data structures identified above. Furthermore, memory 306, optionally, stores additional modules and data structures not described above.

Figure 4:
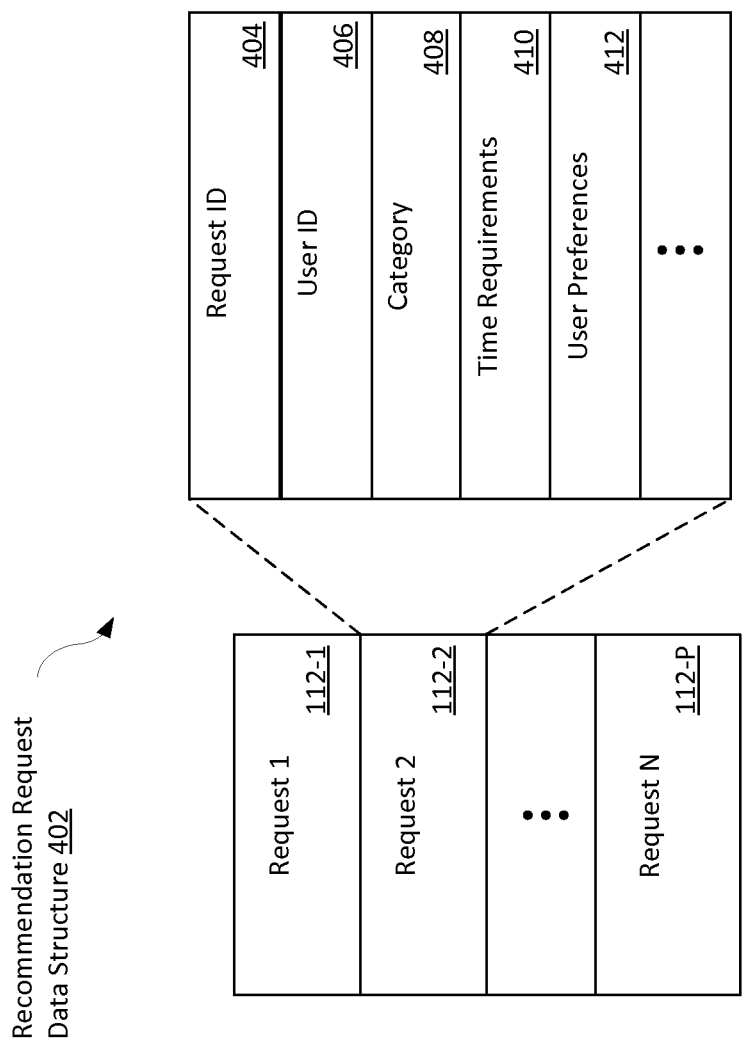
FIG. 4 depicts a block diagram of an exemplary data structure for a recommendation request for requesting a recommendation from the server system.

FIG. 4 depicts a block diagram of an exemplary recommendation request data structure 402 for storing recommendation requests 112 for requesting a recommendation from the server system (FIG. 1, 120). In accordance with some implementations, the recommendation request module 124 stores a plurality of recommendation requests 112-1 through 112-P in the recommendation data structure 402. Each recommendation request 112 corresponds to a user-submitted recommendation request. In some implementations, each recommendation request 112 contains a request ID 404 that identifies a particular recommendation request 112, a user ID 406 of the user submitting the request, a category 408 of the product requested, one or more time requirements 410 of the request, and user preferences 412 for the product features.

In some implementations, the category 408 includes the category of product for which the user requests a recommendation. The category 408 includes at least one category from the list of possible categories associated with the server system (FIG. 1, 120). For example, the category 408 may be narrow (e.g., such as Nokia brand smart phones) or broad (e.g., such as men's athletic shoes).

In some implementations, the time requirements 410 describe the time parameters during which the requesting user would like a recommendation. For example, a user might request a recommendation within 24 hours. In some implementations, the time requirements 410 include a default time parameter (e.g., 48 hours) that is used when the user does not specify a time requirement. In some implementations, a recommendation request also includes user preferences 412 regarding the product recommendations. In some implementations, user preferences 412 include any criteria by which potential requests can be distinguished, including the price range specified by the user, brands or vendors favored by the user, colors, styles, size of the product, options included with the product, quantity of the product available, material used to fabricate the product, the number of units, the pattern of the product design, whether the product is local, the level of service associated with the product, whether the vender allows custom modifications, whether the vendor allows special requests of any kind, whether the product comes with a warranty, the assembly status of the product (for example, pre-assembled, partially assembled, or unassembled), the artist or maker associated with the product, the format of the product, the version of the product, whether the price of the product has been reduced as part of a sale, whether the product has been discontinued, and any other feature or characteristic that the user desires for the requested recommendation.

In some implementations, the user preferences 412 can include preferences for delivery options such as the speed of delivery, the cost of delivery, prepaid shipping, the delivery provider, the delivery service provider, delivery insurance availability, the delivery period, white glove delivery options, in-store pick-up options, method of delivery (electronic or physical), the return policy, and the pre-order policy, or any other delivery option that may be preferred by a user.

In some implementations, the user preferences 412 include gift options such as the availability to ship to multiple addresses, whether the product can be gift-wrapped, whether a gift note or card can be included, and whether a gift receipt is available. In some implementations, one or more of the user preferences 412 are mandatory for certain categories of products.

Figure 5:
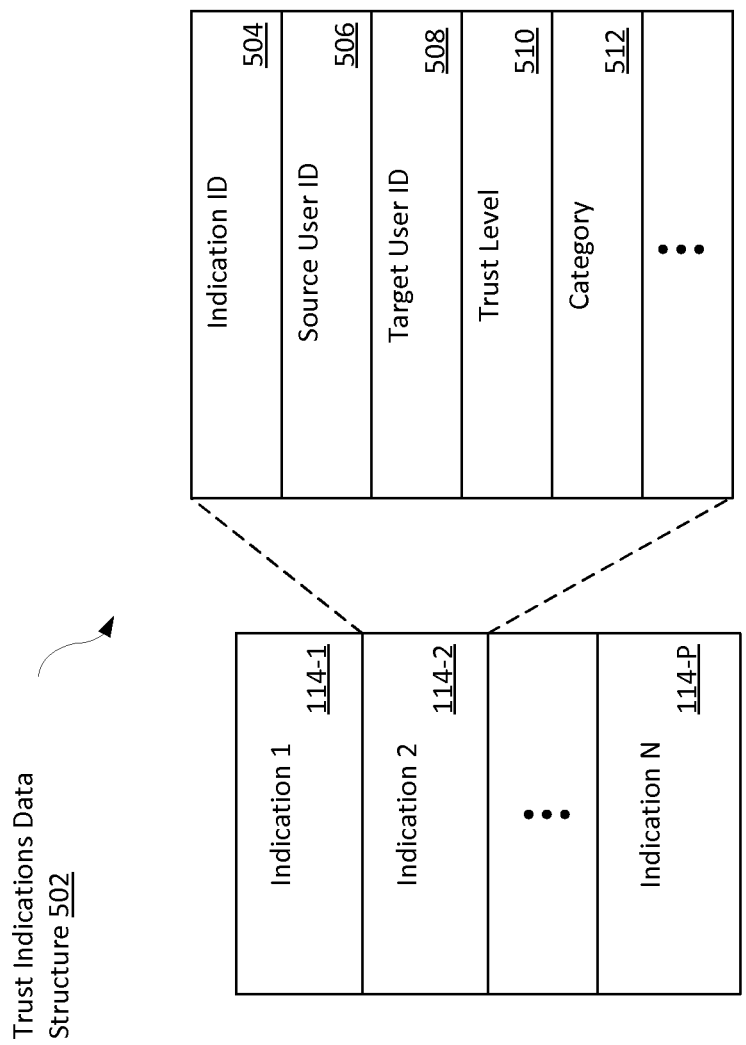
FIG. 5 depicts a block diagram of an exemplary data structure for a trust indication that is sent to the server system to build a trust graph for each user.

FIG. 5 depicts a block diagram of an exemplary trust indication data structure 502 for trust indications 114 that are sent to the server system (FIG. 1, 120) to build a trust graph for each user. As an example, trust indication data structure 502 can be part of user profile information 150 (FIG. 1) and/or trust graph database 152 (FIG. 1). In accordance with some implementations, the trust indication data structure includes one or more (or a plurality of) trust indications 114-1 to 114-P, each of which corresponds to a user-submitted trust indication. In some implementations, each trust indication 114 includes an indication identification (ID) 504 that identifies a particular trust indication 114, a source user identification 506 of the user submitting the trust indication 114 (e.g., a requesting), the target user identification (ID) 508 representing the ID of the user for whom the trust indication 114 is submitted (e.g., a recommending user), a trust level 510 representing the amount of trust from the requesting user (e.g., the user identified by source user ID 506) has for the recommending user (e.g., the user identified by the target user ID 508), and the category 512 to which the trust applies. For example, the requesting user (Alice) might trust a recommending user (Bob) in the category of electronic cameras. The trust indication would include Alice, Bob, a numerical representation of the level of trust Alice has for Bob, and the category of electronic camera.

Figure 6:
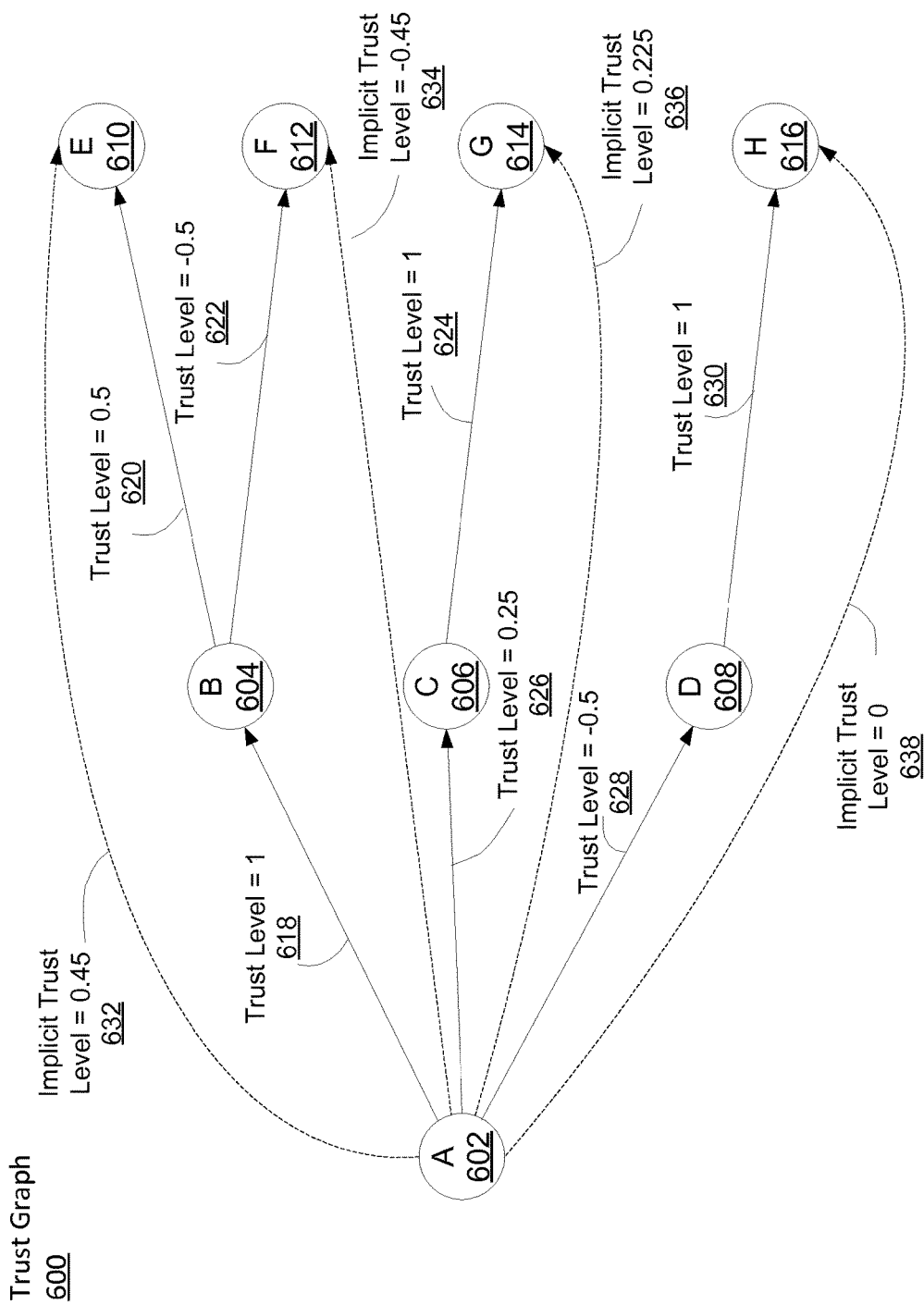
FIG. 6 depicts a block diagram of an exemplary trust graph associated with a user.

FIG. 6 depicts a block diagram of an exemplary trust graph 600 associated with a requesting user. In some implementations, a directed trust graph for a requesting user A 602 includes a plurality of nodes that represent users and a plurality of edges (connections) between users that represent the trust level between users. Because the trust graph is a directed graph, any particular trust level value only gives information as to the trust that the requesting user has for the recommending user. The trust the recommending user has for the requesting user (e.g., when their roles are swapped) is represented in a separate and distinct trust level from the recommending user (e.g., in his or her role as a requesting user) to the requesting user (e.g., in his or her role as a recommending user). As noted above, the trust level is a numerical value that represents the trust from one user to another. In some implementations, the trust level is a number between −1 and 1 where 1 represents full trust, −1 represents complete distrust, and 0 represents no trust information. In some implementations, each trust level is a number between 0 and 1, with no indication of distrust.

In some implementations, a trust graph displays connections between the requesting user A 602 and users for whom the server system (FIG. 1, 120) has trust information (users B 604, C 606, and D 608). The trust graph includes trust levels between user A 602 and users B 604, C 606, and D 608. In some implementations, the trust graph 600 includes users (E 610, F 612, G 614, and H 616) for whom the trust graph 600 has no direct trust indication from user A 602 but does have direct trust indications from users B 604, C 606, and D 608 for whom the trust graph 600 has direct trust indications from user A. In some implementations, the trust graph 600 calculates implicit trust levels for users that user A has not trusted explicitly but who are trusted by users whom user A has trusted. In some cases, the implicit trust level of user A for user C can be calculated by assigning the level of trust for user C of some intermediate user B to user A. For example, if user A trusts user B and user B trusts user C, the implicit or transitive trust level is calculated for user A to user C.

In some implementations, the trust level of user A to user C is a factor of the amount that user A trusts user B (abbreviated A→B) and user B trusts user C (abbreviated B→C). This is calculated by multiplying the trust level of A→B with the trust level of B→C such that the implicit trust level of B→C: A→C=A→B×B→C. For example, if the trust level of A→B is 0.5 and the trust level of B→C is 0.75, then the trust level of is 0.5×0.75=0.375. In some implementations, the implicit trust levels are discounted by a discount value (e.g., a percentage value) to account for the fact that determining implicit trust is inherently unreliable. Such a discount value might be 10%. For example, if a trust value of 0.375 was calculated using the method above, that value may be discounted by 10% to 0.3375. In some implementations, this implicit trust level calculation can be used to determine an implicit trust level for users through any number of user links. In other implementations, the number of user links is limited. For example, in some embodiments, a server system determines that no trust values are implicitly calculated for users who are more than two links away from the current user.

In the trust graph 600 represented in FIG. 6, the requesting user A has a trust level of 1 (618) for user B 604, a trust level of 0.25 (626) for user C 606, and a trust level of −0.5 (628) for user D 608. User B 604 has a trust level of 0.5 (620) for user E 610 and a trust level −0.5 (622) for user F 612. The trust calculation module (FIG. 1, 130) calculates the implicit trust level 632 for user A 602 by multiplying the trust level from A→B 618 and the trust level 620 from B→E and then discounting the resulting value by 10%. Thus, the implicit trust level 632 from A to E is 1×0.5×0.9=0.45, indicating that there is likely some trust from user A 602 to user B 604. Similarly the implicit trust level 634 from user A to user F is 1×(−0.5)×0.9=−0.45, indicating that there is likely some distrust from user A 602 to user F 612. The implicit trust level 636 of A to G is 0.25×1×0.90=0.225.

In some circumstances, there is more than one possible connection path that can be used to generate an implicit trust level. For example, if user A has two different trust levels for user B and user C, and both user B and user C trust user D, the system can use either user B's trust levels or user C's trust level to calculate the implicit trust from user A to user D. In some implementations, the server system (FIG. 1, 120) chooses either the highest or lowest potential implicit trust level. In some implementations, the server system (FIG. 1, 120) averages all the implicit trust levels. In other implementations, the server system (FIG. 1, 120) selects the implicit trust level that includes the fewest connections.

In some implementations, when the user A 602 has a trust level lower than zero for the user D 608, the trust calculation module (FIG. 1, 130) does not use the trust levels of the user D 608 to calculate implicit trust levels. Thus, the implicit trust level 638 of A to H is zero (representing no trust information). In this way no trust information will be inferred through distrusted users. In some implementations, no negative trust values are allowed. In other implementations trust information will be inferred through distrusted users in the same way as it is inferred from trusted users.

Figure 7:
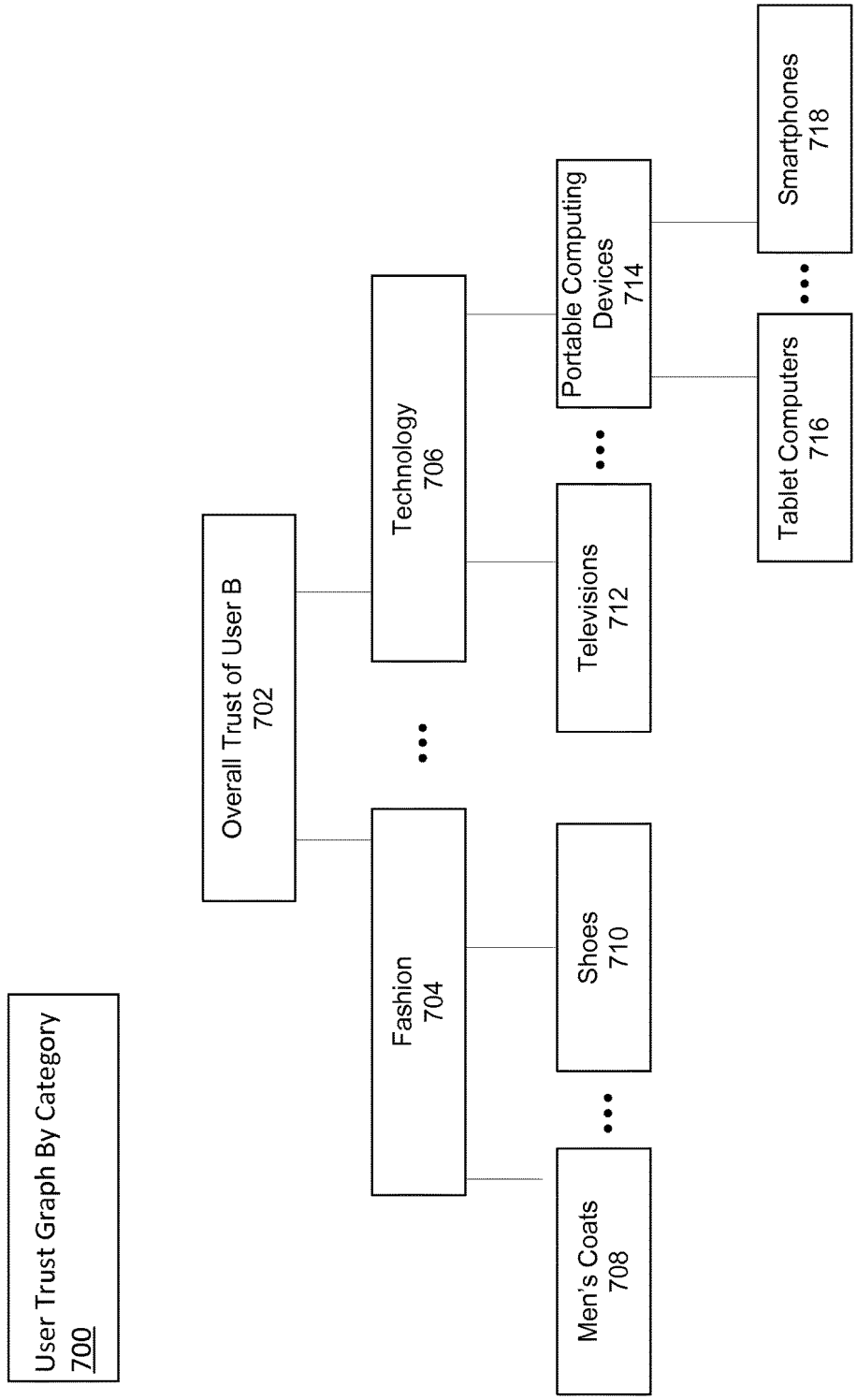
FIG. 7 depicts a block diagram of an exemplary hierarchical taxonomy of trust categories for recording the trust a respective user has for another user, in accordance with some implementations.

FIG. 7 depicts a block diagram of an exemplary hierarchical trust graph 700 displaying the trust a requesting user has for a recommending user B by category. In some implementations, a requesting user may indicate trust in a recommending user in a particular category of goods or services. In this case, the trust information will be stored in a hierarchical trust graph 700. The hierarchical trust graph stores the overall trust level for a user 702. In some implementations, the overall trust level of the recommending user is set directly by the requesting user through a trust indication (FIG. 1, 114). In other implementations, if the requesting user has not indicated an overall trust level for the recommending user, the overall trust level is determined by propagating trust levels for more general categories higher on the hierarchical trust graph (e.g., parent categories). In some implementations, trust levels are discounted as they are propagated upwards to more general categories. In some embodiments, the trust levels are discounted by a fixed percentage, such as 10%. For example, if user A indicates a trust level in portable computing devices 714 of 0.8 that trust level is propagated upwards to technology 706 with a 10% discount. So the trust level from user A to user B in technology 706 would be set to 0.72. In such embodiments, the trust level is propagated further upward to overall trust of user B 702 and discounted again to a trust level of 0.648.

In some implementations, trust levels are also propagated downwards towards more specific categories (e.g., child categories). In some embodiments, trust levels propagated downwards are not discounted. For example, if user A indicates a trust level of 0.5 for user B in the category of fashion 704, this trust level is propagated downward to all subcategories of fashion 704, including men's coats 708 and shoes 710, at the trust level of 0.5 without any discounting. Alternatively, in some implementations, trust levels propagated downward are also discounted.

In some implementations, when propagating trust levels from narrow sub-levels (e.g., child categories) to broader categories higher in the hierarchical graph, more than one candidate trust level may be identified from narrower subcategories. For example, if user A has indicated a trust level of 0.9 for smart phones 718 and a trust level of 0.7 for tablet computers 716, the server system (FIG. 1, 120) needs to determine how to use both levels to determine the overall trust level for portable computing devices 714. In determining the trust level of portable computing devices 714, the trust calculation module (FIG. 1, 130) needs to deal with the trust level of both child categories. In some implementations, the trust level of portable computing device 714 uses the higher of the competing trust levels, resulting in a trust level of 0.9. In some implementations, the trust level of portable computing device 714 uses the lower of the two competing trust levels, resulting in a trust level of 0.7. In some implementations, the two competing trust levels are averaged to produce the trust level of the higher category, resulting in a trust level of 0.8.

In some implementations, the system builds and stores a hierarchical trust graph for each user. In other implementations, the system stores category trust information and only builds the hierarchical trust graph when needed.

Figure 8:
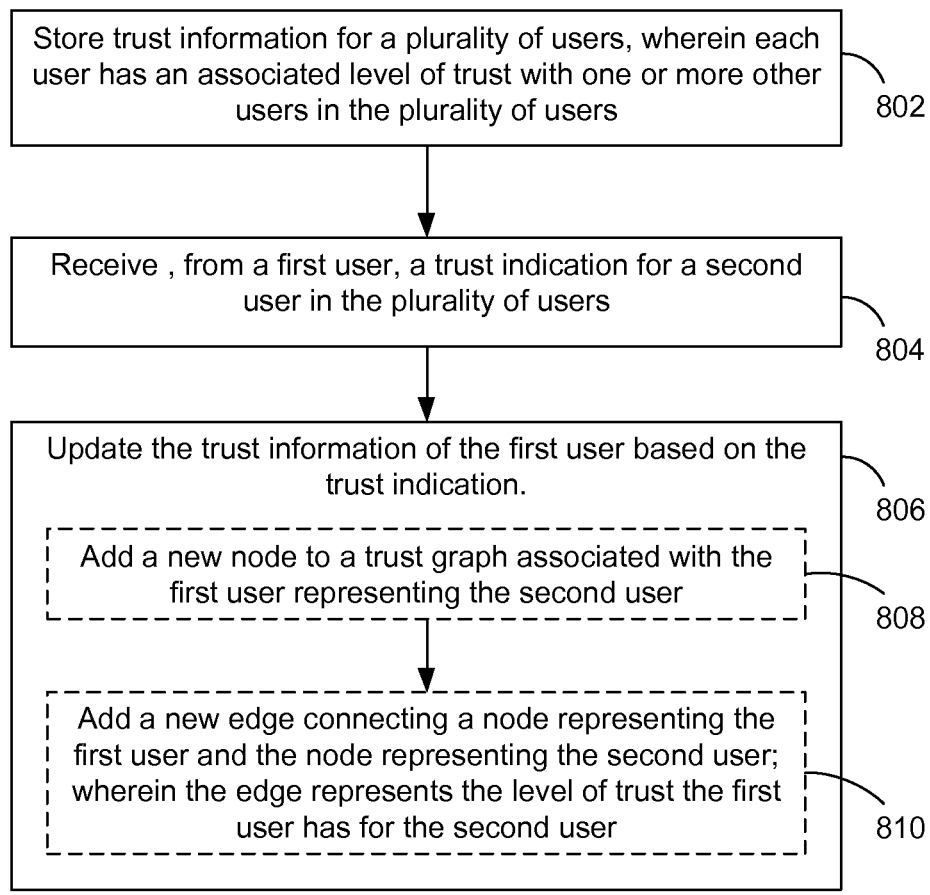
FIG. 8 is a flow diagram illustrating the process for storing levels of trust between users for use in accordance with some implementations.

FIG. 8 is a flow diagram illustrating the process for storing levels of trust between users for use in accordance with some implementations. Each of the operations shown in FIG. 8 may correspond to instructions stored in a computer memory or computer readable storage medium. Optional operations are indicated by dashed lines (e.g., boxes with dashed-line borders). In some implementations, the method described in FIG. 8 is performed by the server system (FIG. 1, 120).

In accordance with some implementations, the server system (FIG. 1, 102) stores trust information for a plurality of users, wherein each user has an associated level of trust with one or more other users in the plurality of users (802). In some implementations, the trust information is a trust graph representing levels of trust between at least some of the users in the plurality of users.

In some implementations, the trust graphs are directed graphs. In some implementations, the server system (FIG. 1, 102) receives, from a first user, a trust indication for a second user in the plurality of users (804). In some implementations, the trust indication includes a level of trust from the first user to the second user. In some implementations, the trust indication further includes a trust category from a plurality of trust categories in which the first user trusts the second user. In some implementations, the plurality of trust categories is arranged in a hierarchical format.

In accordance with some implementations, the server system (FIG. 1, 102) updates the trust information of the first user based on the trust indication (806). In some implementations, updating trust information includes adding a new node to a graph associated with the first user representing the second user (808). In some implementations, updating trust information further includes adding a new edge connecting a node representing the first user and the node representing the second user; wherein the edge represents the level of trust the first user has for the second user (810).

Figure 9:
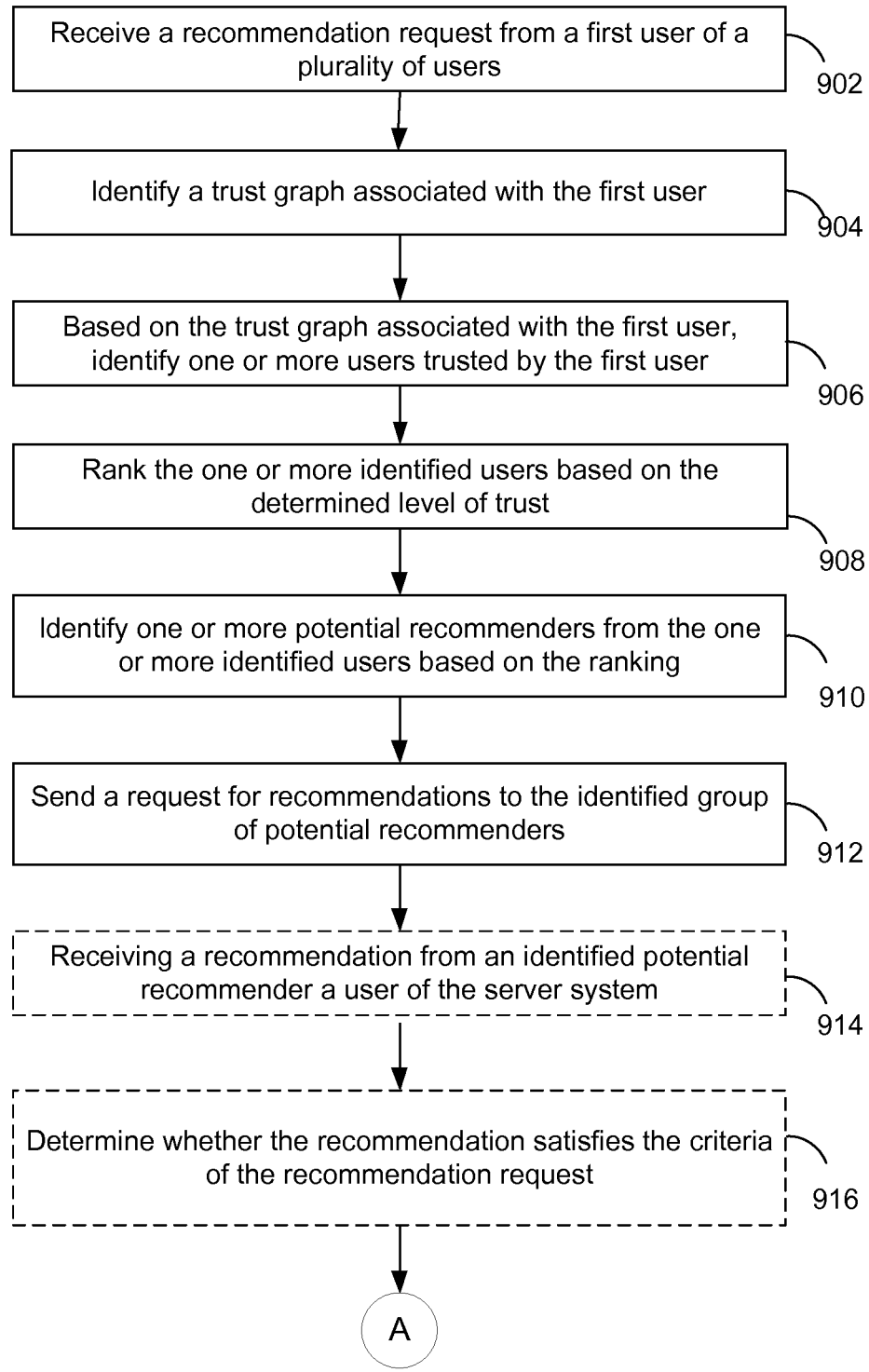
FIG. 9 is a flow diagram illustrating the process for fulfilling a recommendation request in accordance with some implementations.

FIG. 9 is a flow diagram illustrating the process for fulfilling a recommendation request in accordance with some implementations. Each of the operations shown in FIG. 9 may correspond to instructions stored in a computer memory or computer readable storage medium. Optional operations are indicated by dashed lines (e.g., boxes with dashed-line borders). In some implementations, the method described in FIG. 9 is performed by the server system (FIG. 1, 120).

In accordance with some implementations, the server system (FIG. 1, 120) receives a recommendation request from a first user of a plurality of users (902). In some implementations, the recommendation request includes a category of the product requested. In some implementations, the recommendation request includes one or more criteria for evaluating potential recommendations. The one or more criteria can include at least one of the price, style, brand, size, features, and style of the product. In some implementations, the server system (FIG. 1, 120) identifies a trust graph associated with the first user (904). The server system (FIG. 1, 120) then identifies one or more users trusted by the first user, based on the trust graph associated with the first user (906).

In accordance with some implementations, the server system (FIG. 1, 120) ranks the one or more identified users based on the determined level of trust (908). For example, the server system orders the identified users from highest level of trust to lowest level of trust. The server system (FIG. 1, 120) then identifies one or more potential recommenders from the one or more identified users based on the ranking (910). In some implementations, the identified one or more potential recommenders are selected based on the number of communications the users have recently received from the server system (FIG. 1, 120). In this way, the server system (FIG. 1, 120) avoids flooding or overburdening user with too many recommendation requests. The server system (FIG. 1, 120) sends a request for recommendations to the identified group of potential recommenders (912). In some implementations, requests for recommendations are sent over email or text messages. In other implementations, the requests are sent via a server system (FIG. 1, 120) messaging service. In some implementations, the requests are sent using other messaging services/technologies.

In accordance with some implementations, the server system (FIG. 1, 120) receives a recommendation from an identified potential recommending user of the server system (FIG. 1, 120) (914). The server system (FIG. 1, 120) determines whether the recommendation satisfies the criteria of the recommendation request (916). The server can continue to identify (906) additional users, rank (908) the additional users, identify (910) additional recommenders from the additional users, and/or send (912) additional requests for recommendations to the additional recommenders until the server receives (914) a minimum or sufficient number of recommendations.

Figure 10:
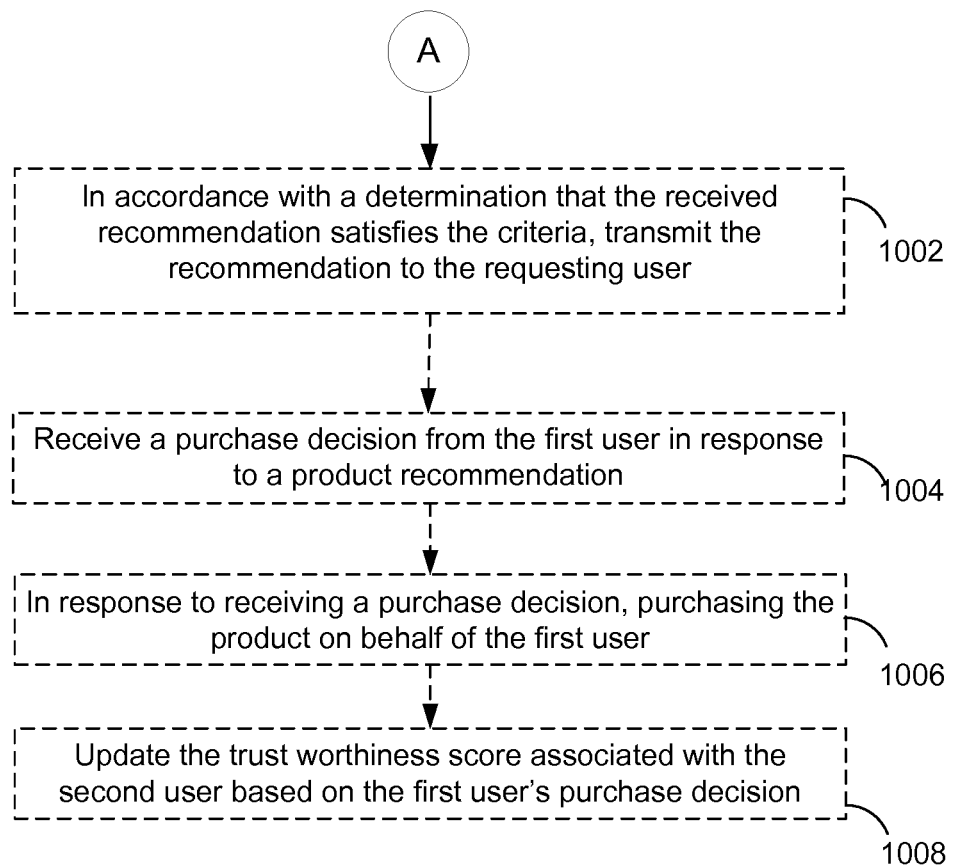
FIG. 10 is a flow diagram illustrating the process for fulfilling a recommendation request in accordance with some implementations.

FIG. 10 illustrates a continuation of method 900 according to some embodiments. In some embodiments, from point A, in accordance with a determination that the received recommendation satisfies the criteria, the server transmits (918) the recommendation to the first user. The recommendation sent to the first user is sent via one or more communication methods such as email, SMS/MMS, social media network posts or messages (e.g., via Facebook or Twitter), instant messaging services, voicemail, or a messaging service internal to the server. The transmission can be repeated for each recommendation to be sent to the first user, or a single transmission can be used to send multiple recommendations to the first user. FIG. 10 is a flow diagram illustrating the process for fulfilling a recommendation request in accordance with some implementations. Each of the operations shown in FIG. 10 may correspond to instructions stored in a computer memory or computer readable storage medium. Optional operations are indicated by dashed lines (e.g., boxes with dashed-line borders). In some implementations, the method described in FIG. 10 is performed by the server system (FIG. 1, 120).

In accordance with some implementations, the server system (FIG. 1, 120), in accordance with a determination that the received recommendation satisfies the criteria, transmits the recommendation to the requesting user (1002). The recommendation is sent to the user via any messaging system including, but not limited to e-mail, text messaging, voice messaging, social network messaging, or a messaging service internal to the server system. The server system (FIG. 1, 120) receives a purchase decision from the first user in response to a product recommendation (1004). In some implementations, the user responds directly to the recommendation server sent from the server system. The server system (FIG. 1, 120), in response to receiving a purchase decision, purchases the product on behalf of the first user (1006). The server system (FIG. 1, 120) updates the trust graph associated with the first user and/or the recommending user based on the purchase decision (1008).

Figure 11:
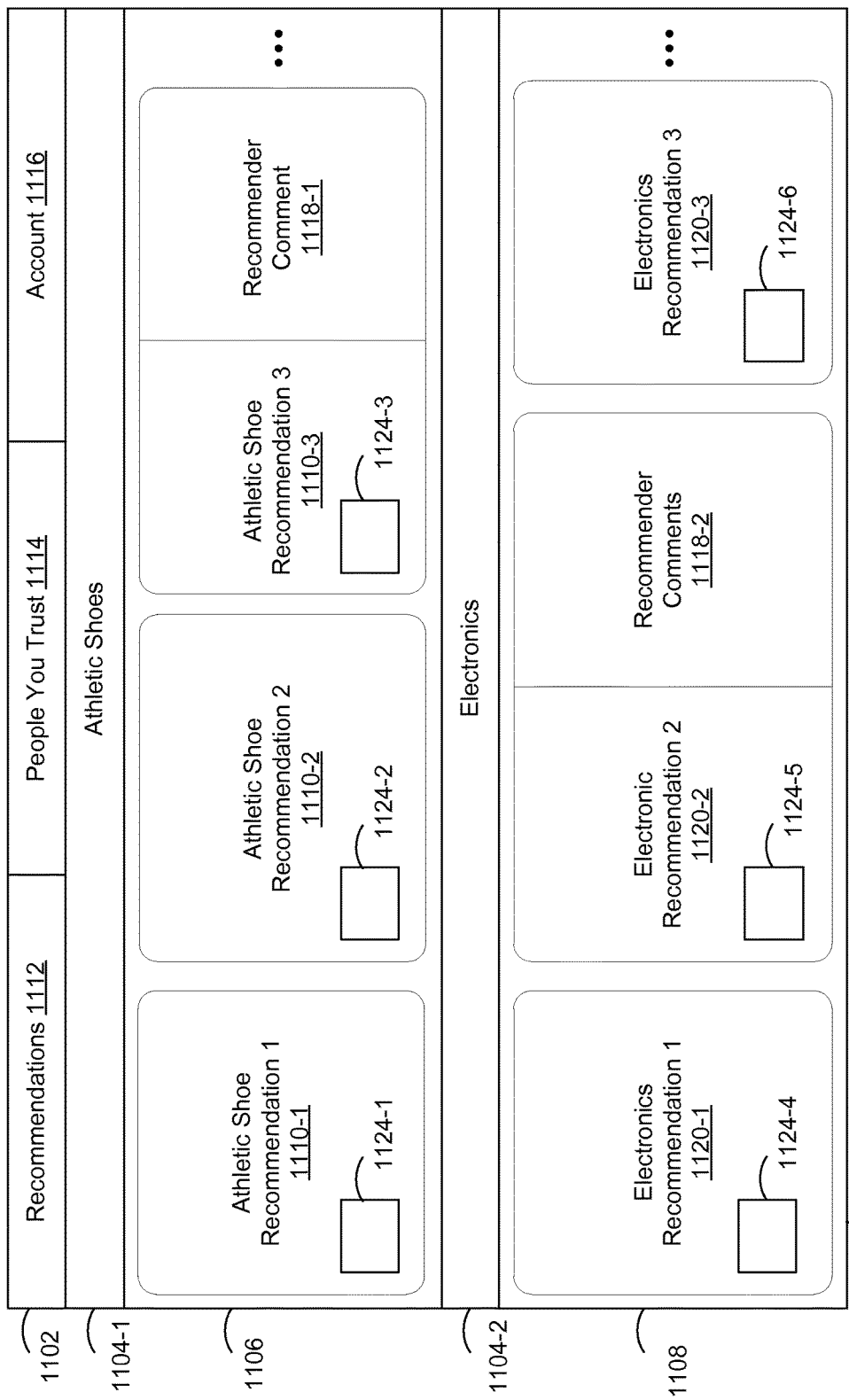
FIG. 11 depicts an exemplary user interface in accordance with some implementations.

FIG. 11 illustrates an exemplary user interface 1100 displaying recommendations of products to a user of a server system (FIG. 1, 120). In this example, a web browser displays a web page associated with the server system (FIG. 1, 120). The web page includes a navigation bar 1102. The navigation bar 1102 includes a plurality of navigation buttons, for example a "Recommendations" button 1112, a "People You Trust" button 1114, and an "Account" button 1116. A user clicks on the various navigation buttons to see different web pages associated with the server system (FIG. 1, 120). In some implementations, the user interacts with a local application on her device rather than a web browser (e.g., a mobile application dedicated to the server system).

In some implementations, the user selects the "Recommendations" button 1112. In response, the server system (FIG. 1, 120) transmits recommendation data to the user for display (e.g., the server system transmits a web page for display in a browser, or instructions to display a user interface in a mobile application). In this example, the displayed data includes regions corresponding to a plurality of product category areas (e.g., product category regions 1104-1 and 1104-2). The server system (FIG. 1, 120) determines the displayed categories based on the user's interests. Each product category region 1104 includes a plurality of product recommendations (e.g., recommendations 1110-1, 1110-2, 1110-3, 1120-1, 1120-2, and 1120-3) and associated images. In this example, the athletic shoes region (1104-1) includes three athletic shoe recommendations (1110-1, 1110-2, and 1110-3).

In some implementations, each recommendation 1110/1120 includes an indication of the recommending user (1124-1 through 1124-6). In some implementations, the indication is an image associated with the recommending user (e.g., a profile picture or avatar). In some implementations, the indication includes the name of the recommending user listed in text. In some implementations, the indication includes a link to the profile of the recommending user. Some implementations include all or some of the above listed indications. In some implementations, the recommendations also include a user interface element, such as a link, button, or another user interface element, that allows the user to request the recommendation source information for that recommendation.

In some implementations, a recommendation 1110/1120 includes recommender comments (e.g., recommender comments 1118-1 or 1118-2) that describe some or all of the recommending user's thoughts on the recommended product in more detail. In some implementations, every recommendation has an associated recommender comment, but they are only shown upon user request. In some implementations, only relevant portions of the comment are shown.

Figure 12A:
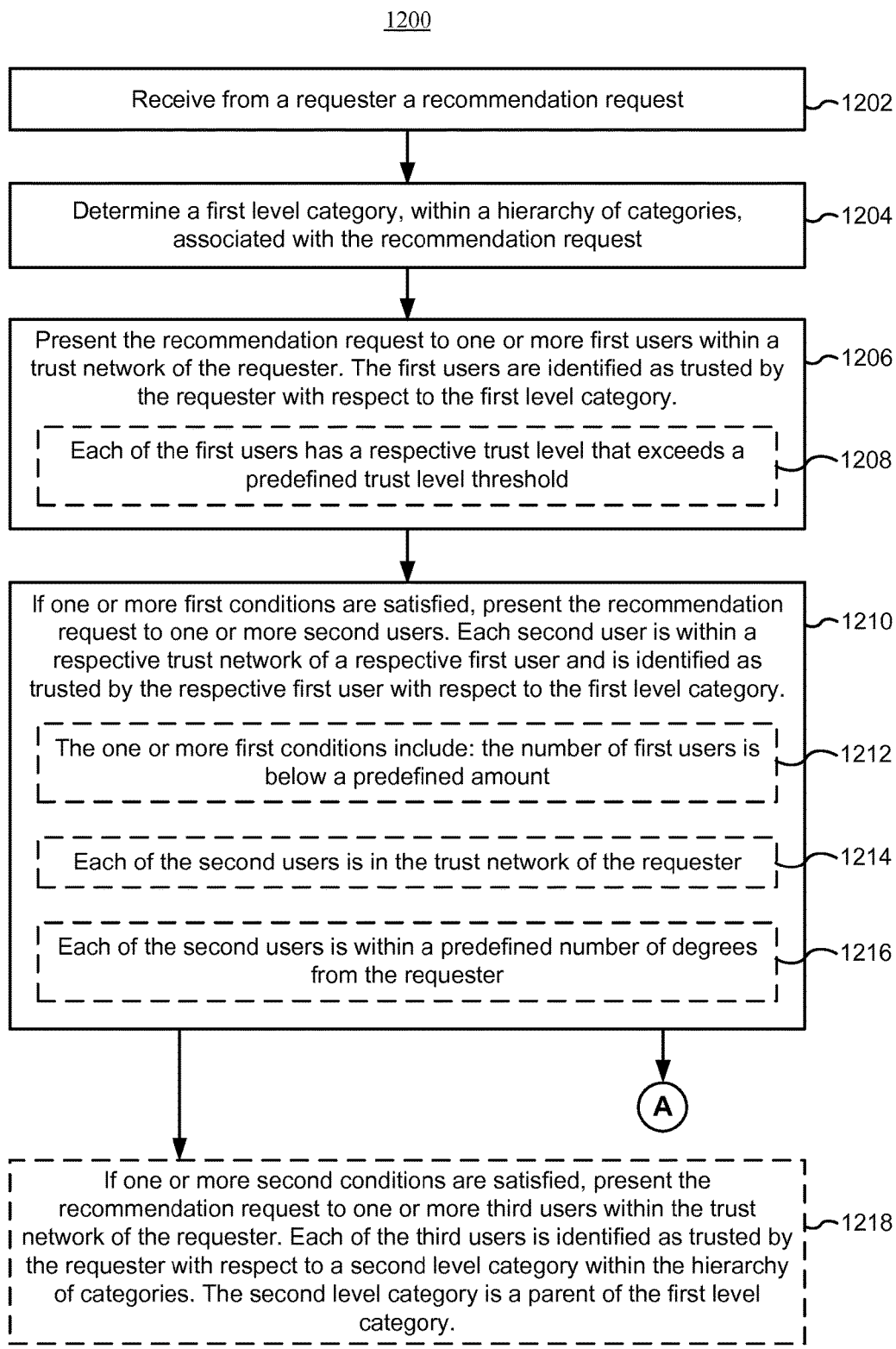
FIG. 12A is a flow diagram illustrating a method for obtaining product recommendations, in accordance with some implementations.
Figure 12B:
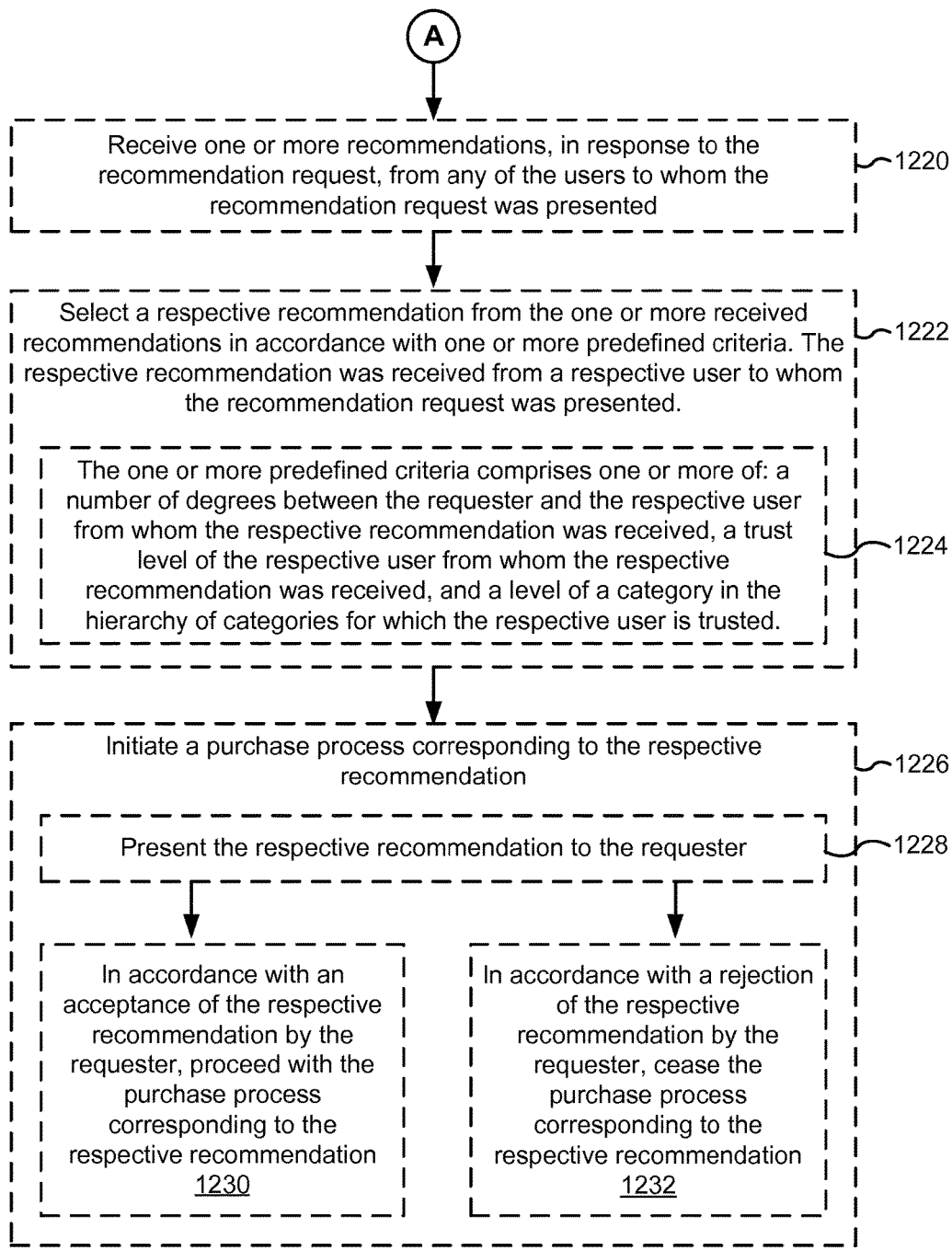
FIG. 12B is a flow diagram illustrating a method for obtaining product recommendations, in accordance with some implementations.

FIGS. 12A-12B are a flow diagram illustrating a method 1200 of obtaining, for a requester (e.g., a requesting user), recommendations for products (e.g., goods or services) from one or more recommenders (e.g., recommending users). The method is, optionally, governed by instructions that are stored in a computer memory or non-transitory computer readable storage medium (e.g., memory 306, FIG. 3) and that are executed by one or more CPUs (e.g., CPUs 302, FIG. 3) of one or more systems, such as, but not limited to, system 120 (FIG. 1). The computer readable storage medium may include a magnetic or optical disk storage device, solid state storage devices such as Flash memory, or other non-volatile memory device or devices. The computer readable instructions stored on the computer readable storage medium may include one or more of: source code, assembly language code, object code, or other instruction format that is interpreted by one or more processors/cores. In various implementations, some operations in each method may be combined and/or the order of some operations may be changed from the order shown in the figures. Also, in some implementations, operations shown in separate figures and/or discussed in association with separate methods (e.g., method 1300, FIG. 13 and/or method 1400, FIG. 14) may be combined to form other methods, and operations shown in the same figure and/or discussed in association with the same method may be separated into different methods. For ease of explanation, at least some aspects of method 1200 are described with reference to a server system (e.g., server system 120, FIG. 1)

The server system receives (1202) from a requester a recommendation request. For example, in some embodiments, the requester is a user of an online shopping forum (e.g., a website) and the requester can request recommendations using a user interface (UI) provided by the online shopping forum. The request is transmitted using an appropriate data structure (e.g., recommendation request data structure 402, FIG. 4) to the server system. In some embodiments, the online shopping forum is a social-networking-based website in which each user has a user-page. The user-page optionally allows the requester to post content for other users to view (e.g., the content includes pictures of products that are interesting, attractive, and/or fashionable to the user), allows other users to post content (e.g., comments, as well as suggestions for products). In some embodiments, the requester can post requests for recommendations directly on his or her user-page. For example, the requester may post, on her user-page, the words, "Does anyone have a recommendation for headphones similar to the M-100s but cheaper?" The server system will, in some embodiments, respond to the post (e.g., in real-time) by parsing the words to recognize that the user is referring to the V-Moda M-100 headphones and that the user is interested in a price point below $310 (the list price of V-Moda M-100 headphones). In some embodiments, the server system will send a confirmation request to the requester's client device asking, for example, "Are you interested in recommendations for headphones similar to the V-Moda M-100 headphones for less than about $300?" The confirmation request may appear in a displayed region that also includes affordances through which the user can input optional parameters, such as color preferences and/or time requirements (e.g., "How soon do you need the recommendation?").

The server system determines (1204) a first level category, within a hierarchy of categories, associated with the recommendation request. In some embodiments, the determination of the first level category within the hierarchy of categories is made in response to the server system receiving the request for the recommendation (e.g., the determination is made upon receiving the request). For example, when the server system receives a recommendation request for "headphones similar to V-Moda M-100 headphones," the server system determines that the first category is "audio headphones," which belongs to a hierarchy of categories that includes "music," "electronics," and "audio headphones." In some embodiments, the first level category is a leaf-node category in the hierarchy of categories, meaning that the first level category is the most specific category to which the recommendation request belongs. In some embodiments, the first level category is the most specific category to which the request belongs and for which the requester has expressed trust (e.g., identified a trust level) for a predefined number of recommending users (e.g., at least one). For example, a recommendation request for "headphones similar to V-Moda M-100 headphones" may be further categorized as a request belonging to an "over-ear headphones" category. The requester, however, may not have expressed trust for any users in the "over-ear headphones" category, or even for the "headphone" category. In such circumstances, the server system may determine that the first category is "music" because that is the lowest category for which the user has expressed trust in at least a predefined number of other users.

The server system presents (1206) the recommendation request to one or more first users within a trust network of the requester. In some embodiments, the trust network is a collection of other users. In some circumstances, the trust network is represented by (e.g., is defined as) each of the first-level connections (e.g., direct connections) in a user's trust graph (e.g which is stored on the server system). Alternatively, in some embodiments, the trust network is defined as a collection of other users who are within a predefined number of degrees within the user's trust graph (e.g., three degrees, five degrees). In some embodiments, the user can set the number of predefined degrees. In some embodiments, a user's trust network is defined as a collection of all other users who are either explicitly or implicitly trusted by the users (e.g., using any of the methods for implicitly calculating trust described elsewhere in this document). For example, in an implementation in which trust values range from −1 to 1, with trust values greater than 0 indicating trust, the trust network for a respective user may include each other user who has a trust value greater than 0 as calculated explicitly or implicitly with respect to the respective user (e.g., taking into account the trust discounting methods described elsewhere). Thus, in such embodiments. "strong." branches of the trust graph (e.g., branches with a high degree of trust between users) will contribute to the respective user's trust network to a greater number of degrees away from the respective user, whereas "weak" branches (e.g., branches with a low degree of trust between users) will be more limited in the number of other user's contributed to the respective user's trust graph. Trust graphs are described in greater detail elsewhere in this document.

The first users are identified as trusted (e.g., in the trust network) by the requester with respect to the first level category. In some embodiments, the server system forgoes identifying, as first users, one or more burnt out users. The burnt out users comprise users who are identified as trusted by the requester with respect to the first level category, but have previously received a predefined number of requests for recommendations within a predefined time period. The burnt out users alternatively or additionally can comprise users who are identified as trusted by the requester with respect to the first level category, but have not responded to a predefined number of requests for recommendations within a predefined time period.

In some embodiments, each of the first users has (1208) a respective trust level that exceeds a predefined trust level threshold. As described in greater detail above, in some embodiments, each trust level is expressed as a value between 0 and 1, with a value of 0 expressing no trust information and a value of 1 expressing absolute trust in the recommending user's taste and product knowledge. In some such embodiments, the predefined trust level threshold is 0.5. Alternatively, in some embodiments, each trust level is expressed as a value between −1 and 1, with a value of −1 expressing absolute distrust and a value of 1 expressing absolute trust. In some such embodiments, the predefined trust level threshold is 0 (e.g., the server system will identify as trusted, with respect to the first level category, any user that is not distrusted by the requester). In some embodiments, the predefined trust level threshold is user-configurable. In some embodiments, other numerical values and/or ranges are used.

If one or more first conditions are satisfied, the server system presents (1210) the recommendation request to one or more second users. Each second user is within a respective trust network of a respective first user and is identified as trusted by the respective first user with respect to the first level category. In some embodiments, the one or more first conditions include (1212): the number of first users is below a predefined amount. In some embodiments, the second users can include one or more users implicitly trusted by the requester (e.g., users for which the requester has not indicated a trust level, but are nonetheless trusted by virtue of a trust chain leading back to the requester). In some embodiments, the one or more first conditions include that a predefined number of first user responses have been received (see operation 1220) within a predefined amount of time. For example, the server system may require that at least one response be received within an amount of time indicated by the user (see time requirements 410, FIG. 4) and/or within a default period of time.

In some embodiments, each of the second users is (1214) in the trust network of the requester. For example, user A might trust user B, who in turn trusts user C, all with respect to the first level category. In this case, in some embodiments, user C is identified by the server system as a second user trusted by a first user with respect to the first level category. In some embodiments, the second users are second-level connections in the requester's trust graph. In some embodiments, each of the second users is (1216) within a predefined number of degrees from the requester (e.g., 3, 4, 5 degrees from the requester).

In some embodiments, if one or more second conditions are satisfied, the server system presents (1218) the recommendation request to one or more third users within the trust network of the requester. Each of the third users is identified as trusted by the requester with respect to a second level category within the hierarchy of categories (e.g., explicitly through a trust indication sent by the requestor and/or implicitly through a calculation using the requester's trust graph). The second level category is a parent of the first level category. For example, in some embodiments, if user A has explicitly expressed trust in user B with respect to an "audio" category, the server system will identify user B as a trusted third user with respect to a "headphones" category even if the requester has not explicitly expressed trust in user B with respect to the "headphones" category.

In some embodiments, the server system receives (1220) one or more recommendations, in response to the recommendation request, from any of the users to whom the recommendation request was presented. In some embodiments, the server system selects (1222) a respective recommendation from the one or more received recommendations in accordance with one or more predefined criteria. The respective recommendation was received from a respective user to whom the recommendation request was presented. In some embodiments, the one or more predefined criteria comprise (1224) one or more of: a number of degrees between the requester and the respective user from whom the respective recommendation was received, a trust level of the respective user from whom the respective recommendation was received, and a level of a category in the hierarchy of categories for which the respective user is trusted. In some embodiments, the server system forgoes, at least initially, selecting a subset of the one or more recommendations for presentation to the requester (see operation 1228).

In some embodiments, the server system initiates (1226) a purchase process corresponding to the respective recommendation. Initiating the purchase process includes presenting (1228) the respective recommendation to the requester. In accordance with an acceptance of the respective recommendation by the requester, the server system proceeds (1230) with the purchase process corresponding to the respective recommendation. In accordance with a rejection of the respective recommendation by the requester, the server system ceases (1232) the purchase process corresponding to the respective recommendation.

Figure 13:
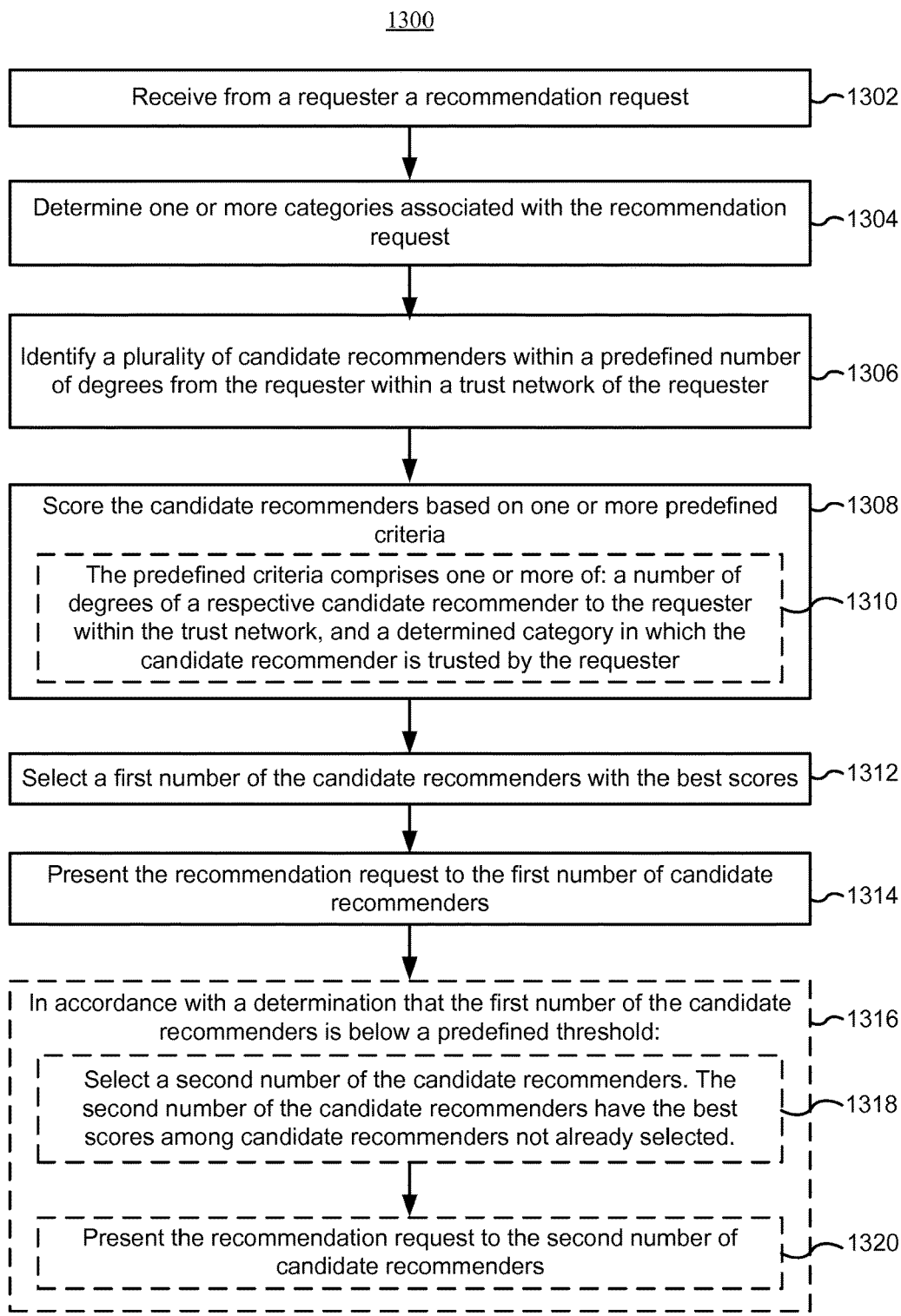
FIG. 13 is a flow diagram illustrating another method for obtaining product recommendations, in accordance with some implementations.

FIG. 13 is a flow diagram illustrating a method 1300 for obtaining, for a requester (e.g., a requesting user), recommendations for products (e.g., goods or services) from one or more recommenders (e.g., recommending users). The method is, optionally, governed by instructions that are stored in a computer memory or non-transitory computer readable storage medium (e.g., memory 306, FIG. 3) and that are executed by one or more processors/cores (e.g., CPU 302, FIG. 3) of one or more systems, such as, but not limited to, system 120 (FIG. 1). The computer readable storage medium may include a magnetic or optical disk storage device, solid state storage devices such as Flash memory, or other non-volatile memory device or devices. The computer readable instructions stored on the computer readable storage medium may include one or more of: source code, assembly language code, object code, or other instruction format that is interpreted by one or more processors/cores. In various implementations, some operations in each method may be combined and/or the order of some operations may be changed from the order shown in the figures. Also, in some implementations, operations shown in separate figures and/or discussed in association with separate methods (e.g., method 1200, FIG. 12 and/or method 1400, FIG. 14) may be combined to form other methods, and operations shown in the same figure and/or discussed in association with the same method may be separated into different methods. For ease of explanation, at least some aspects of method 1200 are described with reference to a server system (e.g., server system 120, FIG. 1)

A server system receives (1302) from a requester a recommendation request. For example, in some embodiments, the requester is a user of an online shopping forum (e.g., a website) and the requester can request recommendations using a user interface (UI) provided by the online shopping forum. The request is transmitted using an appropriate data structure (e.g., recommendation request data structure 402, FIG. 4) to the server system. In some embodiments, the online shopping forum is a social-networking-based website in which each user has a user-page. The user-page optionally allows the requester to post content for other users to view (e.g., the content includes pictures of products that are interesting, attractive, and/or fashionable to the user), allows other users to post content (e.g., comments, as well as suggestions for products). In some embodiments, the requester can post requests for recommendations directly on his or her user-page. For example, the requester may post, on her user-page, the words, "Does anyone have a recommendation for headphones similar to the M-100s but cheaper?" The server system will, in some embodiments, respond to the post (e.g., in real-time) by parsing the words (e.g., using auto-complete technology) to recognize that the user is referring to the V-Moda M-100 headphones and that the user is interested in a price point below $310 (the list price of V-Moda M-100 headphones). In some embodiments, the server system will send a confirmation request to the requester's client device asking, for example, "Are you interested in recommendations for headphones similar to the V-Moda M-100 headphones for less than about $300?" The confirmation request may appear in a displayed region that also includes affordances through which the user can input optional parameters, such as color preferences and time requirements (e.g., "How soon do you need the recommendation?").

In some embodiments, the user can browse through displayed products and request recommendations similar to products that he sees (e.g., by using a "Get recommendations for similar products" button). In some embodiments, when a user requests a similar product, a user interface is displayed through which the user can further specify the parameters of the recommendation request (e.g., produce size, color, price range, delivery options).

The server system determines (1304) one or more categories associated with the recommendation request. In some embodiments, the one or more categories comprise a plurality of categories that are characterized by a hierarchical relationship among them. For example, when the server system receives a recommendation request for "headphones similar to V-Moria M-100 headphones," the server system determines that the first category is "audio headphones," which belongs to a hierarchy of categories that includes "music," "electronics," and "audio headphones." In some embodiments, the one or more categories include a plurality of categories with no hierarchical relationship among them.

The server system identifies (1306) a plurality of candidate recommenders within a predefined number of degrees from the requester within a trust network (e.g., a trust graph) of the requester. For example, when the predefined number of degrees is one, the server system identifies first-level connections (e.g., those users who the request has directly indicated a level of trust). In some embodiments, the predefined number of degrees is a number greater than one, such as two, three, or ten.

The server system scores (1308) the candidate recommenders based on one or more predefined criteria. In some embodiments, the predefined criteria comprise (1310) one or more of: a number of degrees of a respective candidate recommender to the requester within the trust network, and a determined category in which the candidate recommender is trusted by the requester. In some embodiments, the candidates are scored according to a trust level that can be ascertained with respect to the recommendation request. For example, when the requester has explicitly indicated a trust level for a candidate recommender in one of the one or more identified categories associated with the recommendation request, in some embodiments, that candidate recommender's score is simply the indicated trust level. In some embodiments, when the requester has explicitly indicated a trust level for a candidate recommender in a parent-category of a respective category of the one or more categories, the server system reduces the indicated trust level by a first predefined amount for every level of removal in the hierarchy (e.g., every branch traversed in the user trust graph by category 700). In some embodiments, the server system reduces trust levels by a second predetermined amount for every degree beyond the first degree of a respective candidate recommender to the requester within the trust network (thus a second degree connection is once reduced by the second predefined amount, a third degree connection is twice reduced by the second predefined amount, etc.) When conflicts arise in an implicit trust score, various algorithms are used to resolve those conflicts, as described elsewhere in this document.

The server system selects (1312) a first number of the candidate recommenders with the best scores. The best scores are the scores indicating the highest level of trust from the request to the candidate recommender, e.g., with respect to the one or more identified categories.

The server system presents (1314) the recommendation request to the first number of candidate recommenders (e.g., a first plurality of candidate recommenders comprising a first count of candidate recommenders). In some embodiments, the recommendation request is presented in an electronic mail (e-mail) message to the candidate recommenders. In some embodiments, the recommendation request is presented as a push-notification to a candidate's portable multifunction device (e.g., smart-phone, tablet computer, etc).

In accordance with a determination (1316) that the first number of the candidate recommenders is below a predefined threshold, the server system selects (1318) a second number of the candidate recommenders (e.g., a first plurality of candidate recommenders comprising a first count of candidate recommenders). The second number of the candidate recommenders have the best scores among candidate recommenders not already selected. The server system (e.g., in accordance with the selection of the second number of candidate recommenders), presents (1320) the recommendation request to the second number of candidate recommenders. In some embodiments, the server system presents the recommendation request to the second number of users only in accordance with one or more additional criteria, such as in accordance with a determination that a predetermined amount of time has passed without receiving a predetermined number of responses from the first number of candidate recommenders.

Figure 14:
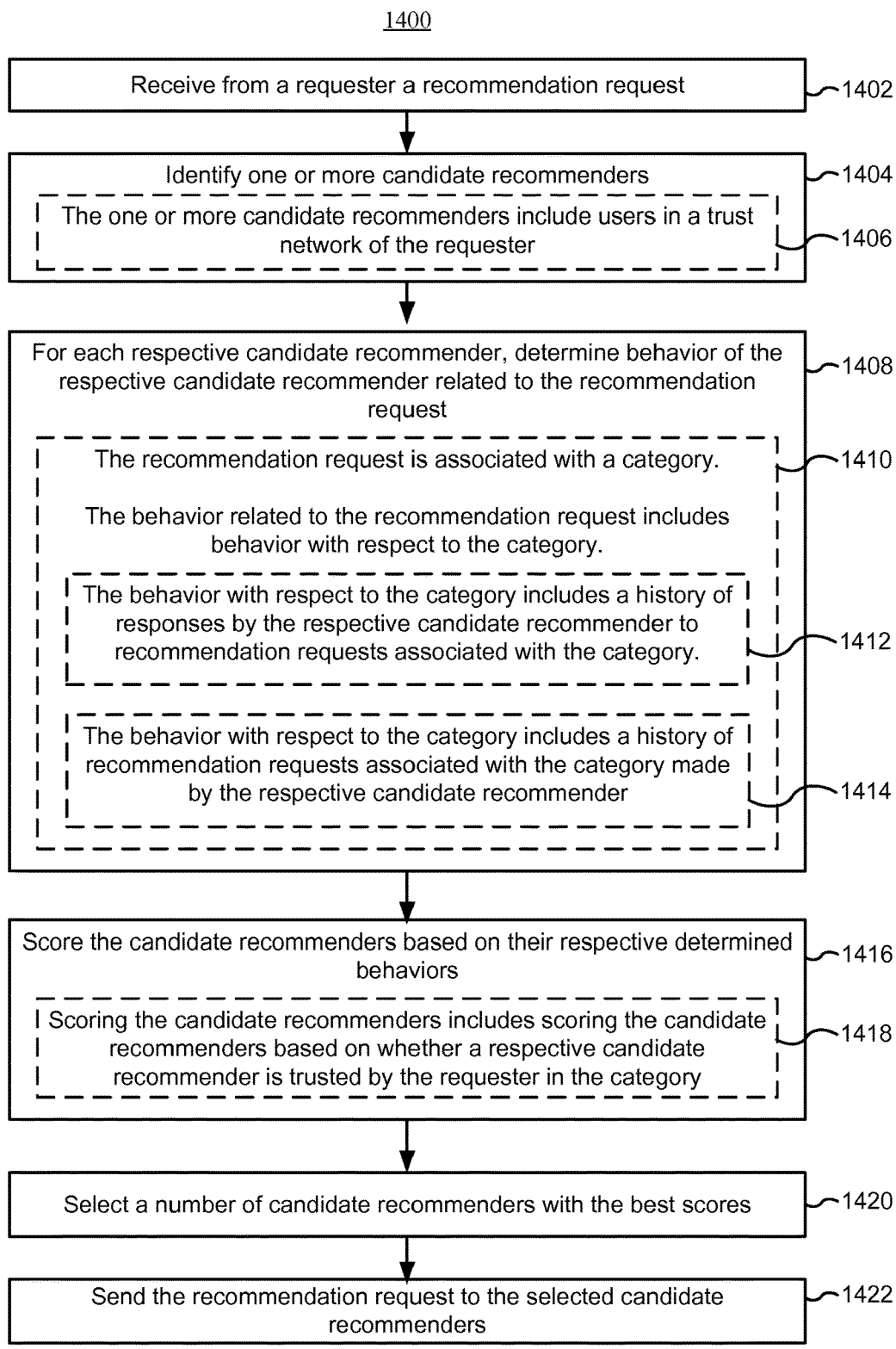
FIG. 14 is a flow diagram illustrating yet another method for obtaining product recommendations, in accordance with some implementations.

FIG. 14 is a flow diagram illustrating a method 1400 for obtaining, for a requester (e.g., a requesting user), recommendations for products (e.g., goods or services) from one or more recommenders (e.g., recommending users). The method is, optionally, governed by instructions that are stored in a computer memory or non-transitory computer readable storage medium (e.g., memory 306, FIG. 3) and that are executed by one or more processors/cores (e.g., CPU 302, FIG. 3) of one or more systems, such as, but not limited to, system 120 (FIG. 1). The computer readable storage medium may include a magnetic or optical disk storage device, solid state storage devices such as Flash memory, or other non-volatile memory device or devices. The computer readable instructions stored on the computer readable storage medium may include one or more of: source code, assembly language code, object code, or other instruction format that is interpreted by one or more processors/cores. In various implementations, some operations in each method may be combined and/or the order of some operations may be changed from the order shown in the figures. Also, in some implementations, operations shown in separate figures and/or discussed in association with separate methods (e.g., method 1200, FIG. 12 and/or method 1400, FIG. 14) may be combined to form other methods, and operations shown in the same figure and/or discussed in association with the same method may be separated into different methods. For ease of explanation, at least some aspects of method 1200 are described with reference to a server system (e.g., server system 120, FIG. 1).

A server system receives (1402) from a requester a recommendation request. For example, in some embodiments, the requester is a user of an online shopping forum (e.g., a website) and the requester can request recommendations using a user interface (UI) provided by the online shopping forum. The request is transmitted using an appropriate data structure (e.g., recommendation request data structure 402, FIG. 4) to the server system. In some embodiments, the online shopping forum is a social-networking-based website in which each user has a user-page. The user-page optionally allows the requester to post content for other users to view (e.g., the content includes pictures of products that are interesting, attractive, and/or fashionable to the user), and allows other users to post content (e.g., comments, as well as suggestions for products). Among other things, in some embodiments, the requester can post requests for recommendations directly on his or her user-page. For example, the requester may post, on her user-page, the words, "Does anyone have a recommendation for headphones similar to the M-100s but cheaper?" The server system will, in some embodiments, respond to the post (e.g., in real-time) by parsing the words to recognize that the user is referring to the V-Moda M-100 headphones and that the user is interested in a price point below $310 (the list price of V-Moda M-100 headphones). In some embodiments, the server system will send a confirmation request to the requester's client device asking, for example, "Are you interested in recommendations for headphones similar to the V-Moda M-100 headphones for less than about $300?" The confirmation request may appear in a displayed region that also includes affordances through which the user can input optional parameters, such as color preferences and time requirements (e.g., "How soon do you need the recommendation?").

The server system identifies (1404) one or more candidate recommenders. In some embodiments, the one or more candidate recommenders include (1406) users in a trust network of the requester. In some embodiments, the one or more candidate recommenders include at least one recommender that is two or more degrees from the requester in the requester's trust network.

For each respective candidate recommender, the server system determines (1408) behavior of the respective candidate recommender related to the recommendation request. In some embodiments, the recommendation request is (1410) associated with a category. The behavior related to the recommendation request includes behavior with respect to the category. In some embodiments, the behavior with respect to the category includes (1412) a history of responses by the respective candidate recommender to recommendation requests associated with the category. In some embodiments, the behavior with respect to the category includes (1414) a history of recommendation requests associated with the category made by the respective candidate recommender. In some embodiments, candidate recommenders can earn "tastemaker status" with respect to a category by offering a large number of successful suggestions in the category. In some embodiments, suggestions are deemed successful when users purchase a product based on the recommender's suggestion and/or other users rate the recommenders suggestions highly (e.g., by giving the recommendation a certain number of stars, "liking the recommendation," etc.).

In some embodiments, the server system scores (1416) the candidate recommenders based on their respective determined behaviors. In some embodiments, scoring the candidate recommenders includes (1418) scoring the candidate recommenders based on whether a respective candidate recommender is trusted by the requester in the category. In some embodiments, the server system scores the candidate recommenders based on whether the candidate recommenders have a predetermined status with respect to the category.

In some embodiments, the server system select (1420) a number of candidate recommenders with the best scores. In some embodiments, the server system sends (1422) the recommendation request to the selected candidate recommenders.

Figure 15:
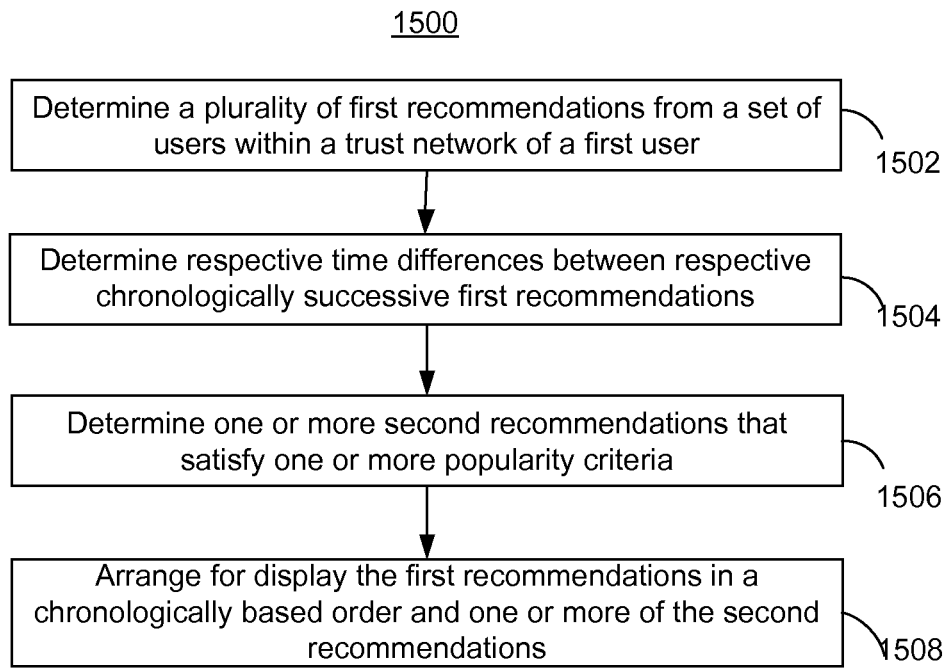
FIG. 15 a method of providing a catalog of trending and trusted items according to an embodiment.

FIG. 15 illustrates a flow diagram illustrating a method 1500 for providing a catalog of trending or trusted items. Method 1500 is, optionally, governed by instructions that are stored in a computer memory or non-transitory computer readable storage medium (e.g., memory 306, FIG. 3) and that are executed by one or more processors/cores (e.g., CPU 302, FIG. 3) of one or more systems, such as, but not limited to, system 120 (FIG. 1). The computer readable storage medium may include a magnetic or optical disk storage device, solid state storage devices such as Flash memory, or other non-volatile memory device or devices. The computer readable instructions stored on the computer readable storage medium may include one or more of: source code, assembly language code, object code, or other instruction format that is interpreted by one or more processors/cores. In various implementations, some operations in each method may be combined and/or the order of some operations may be changed from the order shown in the figures. Also, in some implementations, operations shown in separate figures and/or discussed in association with separate methods may be combined to form other methods, and operations shown in the same figure and/or discussed in association with the same method may be separated into different methods. For ease of explanation, some aspects of method 1500 can be understood with reference to a server system (e.g., server system 120, FIG. 1).

Method 1500 can comprise implementing a system to determine a plurality of first recommendations from a set of users within a trust network of a first user (block 1502). In some embodiments, each user from the set of users can be associated with one of the plurality of first recommendations. In many embodiments, method 1500 can further comprise implementing the system to determine respective time differences between respective chronologically successive first recommendations (block 1504) and determine one or more second recommendations that satisfy one or more popularity criteria (block 1506).

In many embodiments, implementing the system to determine one or more second recommendations that satisfy one or more popularity criteria (block 1506) can comprise a situation where the respective recommendation of the one or more second recommendations is recommended by a trusted user from the set of users when the trusted user has a trust level of at least a minimum trust level. In the same or different embodiments, implementing the system to determine one or more second recommendations that satisfy one or more popularity criteria (block 1506) can comprise a situation where the respective recommendation of the one or more second recommendations is recommended by at least a minimum number of users from the set of users. In some embodiments, the minimum number of users from the set of users can be approximately 5 percent to approximately 25 percent of the set of users.

In other embodiments, implementing the system to determine one or more second recommendations that satisfy one or more popularity criteria (block 1506) can comprise, for the respective second recommendation, assigning a score to the respective second recommendation, where the score has an initial value, and also can comprise detecting actions taken by users on the respective second recommendation, updating the score based on the detected actions, and determining that the respective second recommendation satisfies the popularity criteria when the score meets or exceeds a score threshold for the respective second recommendation. In some embodiments, updating the score based on the detected actions can comprise increasing the score of the second recommendation when a respective detected action is at least one of a view of the respective second recommendation by a viewing user, a sharing of the respective second recommendation by the viewing user, or a purchase transaction made by the viewing user in response to the second recommendation. In some embodiments, the score can comprise a point system, wherein a point is added to the popularity score for the second recommendation for each share, approval, purchase, or view by the viewing user. In some embodiments, when the score exceeds the score threshold, the score threshold for the respective second recommendation can be increased. For example, if the score comprises a point based system, when the total points for shares, approvals, purchases, or views are at the threshold of at least 5 points, the score can satisfy the popularity criteria. In other embodiments, when the score is at least 2 points, the score can satisfy the popularity criteria. Each share, approval, purchase, or view can each be 1 point. In some embodiments, the score can be increased by 1 point when the viewing user shares the recommendation. In some embodiments, different actions by the viewing user can be more valuable than other actions. For example, a share can be 2 points, while a view can be 0.5 points.

In many embodiments, method 1500 further comprises implementing the system to arrange for display the first recommendations in a chronologically-based order and one or more of the second recommendations (block 1508). In some embodiments, a respective second recommendation can be inserted between respective chronologically successive first recommendations whose time difference is greater than a threshold. For example, a first respective second recommendations can be placed between successive recommendations whose time difference is greater than approximately 1 minute to approximately 5 minutes. In other embodiments, the first respective second recommendations can be placed between successive recommendations whose time difference is greater than approximately 1 hour to approximately 5 hours, while in some other embodiments, the time difference can be greater than approximately 10 hours to approximately 24 hours, or greater than approximately 2 days to 5 days. In some embodiments, implementing the system to arrange for display the first recommendations in the chronologically based order can comprise arranging for display the first recommendations in a reverse chronological order. In some embodiments, arranging for display further comprises sending instructions to display the catalog of recommendations for the first user to the first user.

Figure 16:
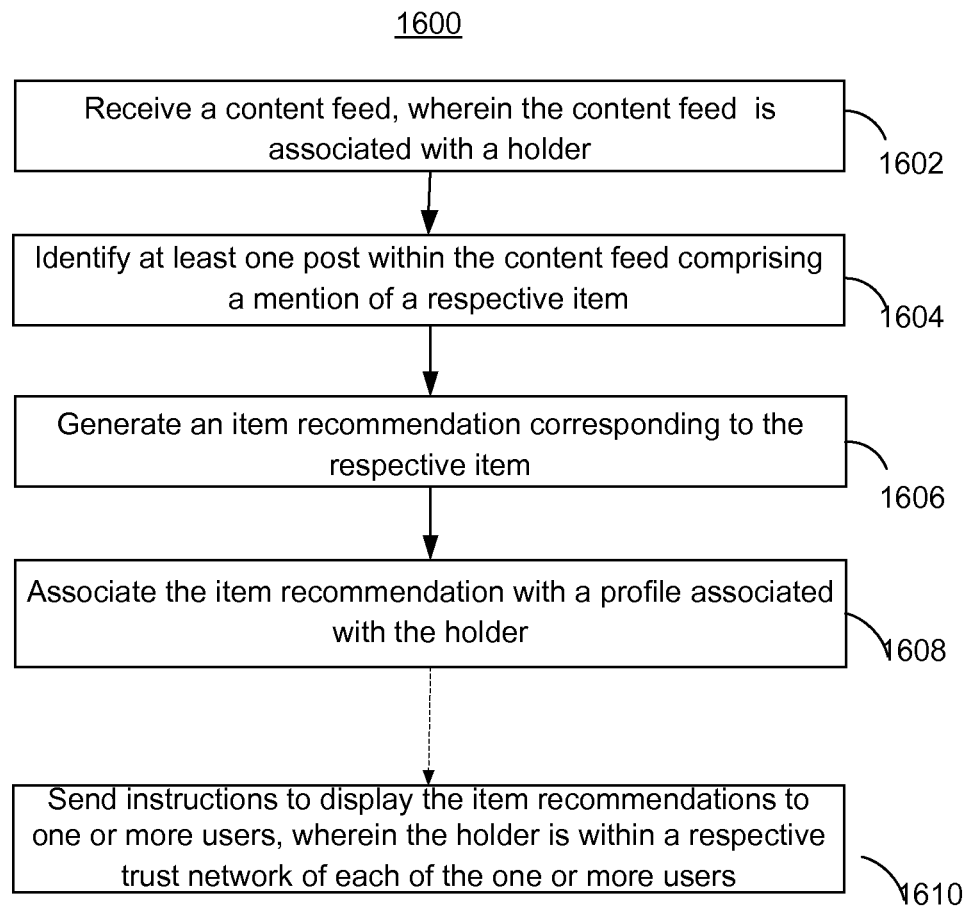
FIG. 16 is a method of recommendation scraping according to an embodiment.

FIG. 16 illustrates a method 1600 for recommendation scraping. Method 1600 is, optionally, governed by instructions that are stored in a computer memory or non-transitory computer readable storage medium (e.g., memory 306, FIG. 3) and that are executed by one or more processors/cores (e.g., CPU 302, FIG. 3) of one or more systems, such as, but not limited to, system 120 (FIG. 1). The computer readable storage medium may include a magnetic or optical disk storage device, solid state storage devices such as Flash memory, or other non-volatile memory device or devices. The computer readable instructions stored on the computer readable storage medium may include one or more of: source code, assembly language code, object code, or other instruction format that is interpreted by one or more processors/cores. In various implementations, some operations in each method may be combined and/or the order of some operations may be changed from the order shown in the figures. Also, in some implementations, operations shown in separate figures and/or discussed in association with separate methods may be combined to form other methods, and operations shown in the same figure and/or discussed in association with the same method may be separated into different methods. For ease of explanation, some aspects of method 1600 can be understood with reference to a server system (e.g., server system 120, FIG. 1).

Method 1600 can comprise implementing a system to receive a content feed (block 1602). In some embodiments, the content feed is associated with a holder. In many embodiments, the content feed comprises a social network content feed associated with the holder, a blog associated with the user, a microblog associated with the holder, or an image collection associated with the holder. If the content feed comprise a weblog or microblog feed associated with the holder, the weblog or microblog can be scraped for information.

In some embodiments, method 1600 can further comprise implementing the system to identify at least one post within the content feed comprising a mention of a respective item (block 1604). In some embodiments, the system can be implemented to determine if the mention of the respective item is at least one of a positive mention, a neutral mention, or a negative mention. In many embodiments, the system can use natural language processing to determine if the mention of the respective item is at least one of the positive mention, the neutral mention, or the negative mention. In some embodiments, the system can use text mining to determine if the mention of the respective item is at least one of the positive mention, the neutral mention, or the negative mention.

Method 1600 can further comprise implementing the system to generate an item recommendation corresponding to the respective item (block 1606) and associate the item recommendation with a profile associated with the holder (block 1608). The generation of the item recommendation can be based on the text mining process or other aspects of block 1604. In many embodiments, the profile associated with the holder (block 1608) can correspond to a user account associated with the holder.

In many embodiments, method 1600 can comprise implementing the system to send instructions to display the item recommendations to one or more users, wherein the holder is within a respective trust network of each of the one or more users (block 1610). In some embodiments, the item recommendation includes an indication to initiate a transaction to purchase the item recommendation.

In some embodiments, method 1600 determines if the user account associated with the holder is active. If the user account is inactive, method 1600 can implement the system to generate the profile associated with the holder and associate the item recommendations with the profile. In some embodiments, if the user account associated with the holder is active, method 1600 can implement the system to associate the item recommendations with the profile associated with the holder, wherein the profile associated with the holder corresponds to the user account associated with the holder. In some embodiments, if the user account associated with the holder is inactive, method 1600 can implement the system to send an invitation to the holder to activate the user account and correlate the profile associated with the holder and the user account upon activation of the user account. In some embodiments, the system can generate a trust graph associated with the holder from information scraped from the holder's relationships, friends, or follows in networks associated with the content feed. For example, the content feed can be the holder's microblog account. Within the microblog account, the holder follows 20 other microblog users. From the different likes, loves, follows, and comments, the system can determine automatically which microblog users that the holder trusts. In some embodiments, the system can determine which microblog users that the holder trusts for individual categories.

Figure 17:
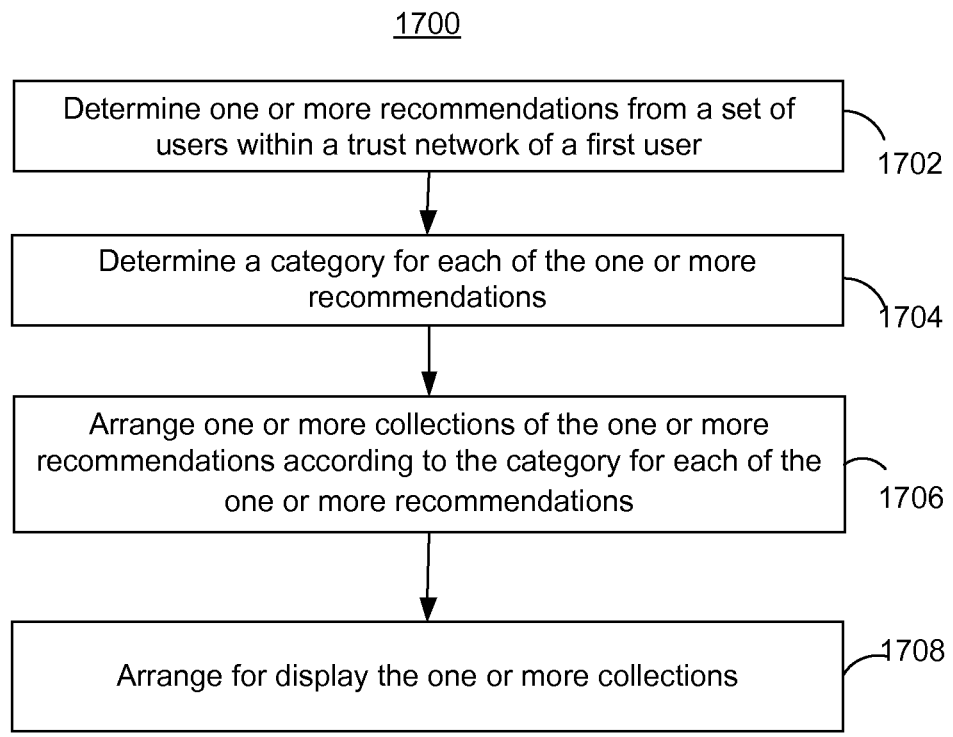
FIG. 17 is a method of providing a collections search according to an embodiment.

FIG. 17 illustrates a method 1700 for providing a collections search. In some embodiments, method 1700 comprises implementing a system to determine one or more recommendations from a set of users with a trust network of a first user (block 1702). In some embodiments, each user from the set of users can be associated with one of the plurality of first recommendations. In many embodiments, at least one user of the set of users within the trust network of the first user is identified as trusted by the first user based in part on a public profile of the first user. In some embodiments, implementing the system to determine one or more recommendations comprises receiving a content feed from at least one of the set of users. The content feed can comprise a social network content feed, a blog, a microblog, or an image collection. In many embodiments, determining one or more recommendations from the content feed can comprise identifying at least one post within the content feed comprising a mention of a respective item; and implementing the system to determine if the mention of the respective item is at least one of a positive mention a neutral mention, or a negative mention, and arrange the recommendations within the one or more collections according to whether the mention is the positive mention, the neutral mention, or the negative mention.

Method 1700 can further comprise implementing the system to determine a category for each of the one or more recommendations (block 1704), arrange one or more collections of the one or more recommendations according to the category for each of the one or more recommendations (block 1706), and arrange for display the one or more collections (block 1708). In some embodiments, method 1700 further comprises implementing the system to determine that the respective recommendation satisfies the popularity criteria when the score meets or exceeds a score threshold for the respective recommendation. In some embodiments, the one or more popularity criteria comprise the respective recommendation of the one or more recommendations that are recommended by at least a minimum number of users from the set of users. In the same or different embodiments, the one or more popularity criteria comprise the respective recommendation of the one or more recommendations that are recommended by a trusted user from the set of user, wherein the trusted user has a trust level of at least a minimum trust level. In many embodiments, method 1700 further comprises implementing the system to order the one or more recommendations according to the score of each respective recommendation. In some embodiments, when the score exceeds the score threshold for the respective recommendation, the score threshold for the respective recommendation can be increased.

In many embodiments, implementing the system to arrange for display the one or more collections (1708) can comprise assigning a score to the respective recommendation, the score having an initial value, detecting actions taken by users on the respective recommendation, and updating the score based on the detected actions. In some embodiments, updating the score based on the detected actions comprises increasing the score when a respective detected action is at least one of a view of the respective recommendation by a viewing user, a sharing of the respective recommendation by the viewing user, or a purchase transaction made by the viewing user in response to the recommendation.

In some embodiments wherein the transitive trust is calculated, the server system selects either the highest or lowest trust level from among the available trust paths or connections. In yet other implementations, the server system selects the implicit trust value that relies on the fewest number of connections or the shortest trust path. In some embodiments, if multiple trust paths have the same shortest trust path or the same fewest number of connections, the multiple trust values of each of the shortest trust paths are averaged.

In some implementations, the server system uses the gathered trust information to improve a user's experience (UX). As an example, the server system can use the trust graph associated with the requesting user, among other factors, to (a) determine one or more candidate recommending users from whom to request a new recommendation and/or (b) in the same or different embodiment, provide to the requesting user a previous recommendation from one or more candidate recommending users. In another embodiment, the server system identifies other recommending users who have similar recommendations or similar recommendation patterns to the recommending users that the requesting user already trusts. Of course, the requesting user can manually set or determine the trust level for particular categories, such as portable computing devices 714 (FIG. 7), where such manual setting or determination can override any automated determination described above.

In some embodiments, the server system can designated a highly influential user within a specific category. For example, if Bob is highly trusted by a significant portion of registered users and/or has a high number of successful recommendations, Bob may be designated as a highly influential user with respect to a specific category for all new or other requesting users who have not made an explicit decision regarding whether to trust Bob.

As an example of the system avoiding flooding users with too many requests for recommendations, in some embodiments, the server system can provide incentives or rewards to the recommending users for responding to the requests for recommendations to motivate the recommending users to respond. Similarly, the server system can monitor whether the recommending users respond to the requests for recommendations, and can send fewer or no requests to particular recommending users if the particular recommending users do not respond to requests in a timely manner or at all regardless of how highly ranked the particular recommending users are. After a predetermined or other time period, the server system can reset and resume sending the normal quantity of requests for recommendations to the particular recommending users. In some embodiments, the server system can send a reminder about the request for a recommendation to the original recommending users. As another example, in some embodiments, a recommending user receives a reward or other form of compensation from the merchant who sold the item and/or from the requesting user who purchase the product or service based on the recommendation of the recommending user.

As an example of the server system using the extra recommendations to build the database of user recommendations, the server system might not need to send requests for a recommendation the next time that a different user requests the same or a similar recommendation. As an example of changing trustworthiness levels, in some embodiments, if Alice, on recommendation from Bob purchases a product, but subsequently returns the product because she did not like the product, the server system will decrease the trust level from Alice to Bob back to the previous level or to a lower level, and/or Bob's overall trustworthiness score is decreased to his previous level or to a lower level. As another example, if Alice submits a had review for the smart phone she purchased, the server system will decrease her trust level for the user who submitted the recommendation, and/or the server system will decrease the overall trust level for the user who submitted the recommendation.

In accordance with some embodiments, the recommendation request module 124 (FIG. 1) stores a plurality of recommendation requests 112-1 through 112-P in the recommendation data structure 402. As an example, recommendation data structure 402 can be part of recommendation request module 124 (FIG. 1) and/or recommendation database 142 (FIG. 1.)

FIG. 5 depicts a block diagram of an exemplary trust indication data structure 502 for trust indications 114 that are sent to server system 120 (FIG. 1) to build a trust graph for each user. As an example, trust indication data structure 502 can be part of user profile information 150 (FIG. 1) and/or trust graph database 152 (FIG. 1).

In FIGS. 9-10, as a further example of fulfilling the recommendation request, the server can continue to identify (906) additional users, rank (908) the additional users, identify (910) additional recommenders from the additional users, and/or send (912) additional requests for recommendations to the additional recommenders until the server receives (914) a minimum or sufficient number of recommendations. FIG. 10 illustrates a continuation of method 900 according to some embodiments. In some embodiments, from point A, in accordance with a determination that the received recommendation satisfies the criteria, the server transmits (918) the recommendation to the first user. The recommendation sent to the first user is sent via one or more communication methods such as email, SMS/MMS, social media network posts or messages (e.g., via Facebook or Twitter), instant messaging services, voicemail, or a messaging service internal to the server. The transmission can be repeated for each recommendation to be sent to the first user, or a single transmission can be used to send multiple recommendations to the first user.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present implementations. The first contact and the second contact are both contacts, but they are not the same contact.

The terminology used in the description of the implementations herein is for the purpose of describing particular implementations only and is not intended to be limiting. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if (a stated condition or event) is detected" may be construed to mean "upon determining" or "in response to determining" or "upon detecting (the stated condition or event)" or "in response to detecting (the stated condition or event)," depending on the context.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A method, comprising:
   receiving, with a computer server system, a request for an item recommendation from a third user of one or more third users, wherein the computer server system comprises a recommendation system and a trust calculation system, wherein the recommendation system is configured to determine potential recommenders in an online trust network of the third user of the one or more third users, wherein the trust calculation system is configured to build a trust graph by identifying trust levels between trusted users in the online trust network of the third user based on trust data, wherein the trusted users comprise a holder, a first user, one or more second users, and the third user of the one or more third users;
   receiving a computerized social media network content feed, with the computer server system, wherein the computerized social media network content feed is associated with the holder, wherein the computerized social media network content feed is configured to be scraped for product information;
   identifying, with the computer server system, at least one post within the computerized social media network content feed comprising a mention of a respective item in a trust category of one or more trust categories;
   determining, with the computer server system, by natural language processing or text mining, that the mention of the respective item is positive, negative, or neutral;
   generating, with the computer server system, the item recommendation corresponding to the respective item based at least in part on the determining that the mention of the respective item is positive;
   associating, with the computer server system, the item recommendation with a profile associated with the holder;
   sending, with the computer server system, instructions to present the item recommendation to the third user of the one or more third users, the holder being within the online trust network of the third user of the one or more third users, the online trust network comprising:
      trust information between the holder and one or more users, each of the one or more users comprising an associated level of trust with the holder and one or more other users of the one or more users, the one or more users comprising the one or more second users;
      a first trust indication from a second user of the one or more second users to the holder, the first trust indication not being directly from the third user to the holder, the first trust indication comprises:
         a first trust level from the second user of the one or more second users to the holder; and
         the trust category of the one or more trust categories in which the second user trusts the holder;
      a second trust indication from the third user of the one or more third users to the second user of the one or more second users, the second trust indication not being directly from the third user to the holder, the second trust indication comprising:
         a second trust level from the third user to the second user; and
         the trust category of the one or more trust categories in which the third user trusts the second user;
      an implicit trust indication from the third user of the one or more third users to the holder based at least in part on the first trust indication from the second user of the one or more second users to the holder and the second trust indication from the third user of the one or more third users to the second user, wherein:
         the third user is within a predetermined number of connections from the holder within the online trust network of the third user, and the third user is not directly connected to the holder within the online trust network of the third user;
         the one or more trust categories are arranged in a hierarchy;
         a level discount comprises a calculation of $p(1-r)$, where p comprises a trust level and r comprises a fixed amount by which the trust level is reduced, the trust level comprises the first trust level or the second trust level;
         the second trust indication between the second user and the third user is propagated to a lower level of the hierarchy without the level discount;
         the second trust indication between the second user and the third user is propagated to a higher level of the hierarchy with the level discount; and
         the level discount further comprises a transitive trust level for the third user within a first trust graph of the first user, wherein the transitive trust level is for the third user based on:
            calculating the transitive trust level for the third user in the first trust graph of the first user based at least in part on a level of trust between the first user and the second user in the first trust graph of the first user; and
            discounting the transitive trust level for the third user by a predefined amount based on the level of trust between the first user and the second user;
   receiving, with the computer server system, a purchase decision from the third user in response to the item recommendation from the holder; and
   initiating, with the computer server system, the purchase transaction by the third user in response to the item recommendation by the holder.

2. The method of claim 1, wherein:
the profile associated with the holder corresponds to a user account associated with the holder for an online network associated with the online trust network of the third user.

3. The method of claim 1, further comprising:
determining when a user account associated with the holder for an online network associated with the online trust network of the third user is active;
when the user account associated with the holder is inactive:
   generating the profile associated with the holder; and
when the user account associated with the holder is active:
   corresponding the profile associated with the holder to the user account associated with the holder.

4. The method of claim 3, further comprising:
when the user account associated with the holder is inactive:
sending an invitation to the holder to activate the user account; and
corresponding the profile associated with the holder to the user account associated with the holder upon activation of the user account.

5. The method of claim 1, wherein:
the computerized social media network content feed comprises:
a weblog associated with the holder, a microblog associated with the holder, or an image collection associated with the holder.

6. The method of claim 1, wherein:
the computerized social media network content feed comprises a weblog or microblog feed associated with the holder identifying the at least one post or the mention of the respective item.

7. The method of claim 1, wherein:
the request for the item recommendation includes an indication to initiate a transaction to purchase the item recommendation.

8. The method of claim 1, further comprising:
determining if a user account associated with the holder for an online network associated with the online trust network of the third user is active;
when the user account associated with the holder is inactive:
generating the profile associated with the holder;
sending an invitation to the holder to activate the user account; and
corresponding the profile associated with the holder to the user account associated with the holder upon activation of the user account; and
when the user account associated with the holder is active:
corresponding the profile associated with the holder to the user account associated with the holder;
wherein:
the computerized social media network content feed comprises:
a weblog associated with the holder, a microblog associated with the holder, or an image collection associated with the holder; and
the request for the item recommendation includes an indication to initiate a transaction to purchase the item recommendation.

9. A method comprising:
receiving, with a computer server system, a request for an item recommendation from a third user of one or more third users, wherein the computer server system comprises a recommendation system and a trust calculation system, wherein the recommendation system is configured to determine potential recommenders in an online trust network of the third user of the one or more third users, wherein the trust calculation system is configured to build a trust graph by identifying trust levels between trusted users in the online trust network of the third user based on trust data, wherein the trusted users comprise a holder, a first user, one or more second users, and the third user of the one or more third users;
receiving a computerized social media network content feed, with the computer server system, wherein the computerized social media network content feed is associated with the holder wherein the computerized social media network content feed is configured to be scraped for product information;
identifying, with the computer server system, at least one post within the computerized social media network content feed comprising a mention of a respective item in a trust category of one or more trust categories;
determining, with the computer server system, by natural language processing or text mining, that the mention of the respective item is positive;
generating, with the computer server system, the item recommendation corresponding to the respective item based at least in part on the determining that the mention of the respective item is positive;
associating, with the computer server system, the item recommendation with a profile associated with the holder;
sending, with the computer server system, instructions to display the item recommendation to the third user of the one or more third users, the holder being within the online trust network of the third user of the one or more third users, the online trust network comprising:
trust information between the holder and one or more users, each of the one or more users comprising an associated level of trust with the holder and one or more other users of the one or more users, the one or more users comprising the one or more second users;
a first trust indication from a second user of the one or more second users to the holder, the first trust indication comprises:
a first trust level from the second user of the one or more second users to the holder; and
the trust category of the one or more trust categories in which the second user trusts the holder;
a second trust indication from the third user of the one or more third users to the second user of the one or more second users, the second trust indication comprising:
a second trust level from the third user to the second user; and
the trust category of the one or more trust categories in which the third user trusts the second user;
an implicit trust indication from the third user of the one or more third users to the holder based at least in part on the first trust indication from the second user of the one or more second users to the holder and the second trust indication from the third user of the one or more third users to the second user, wherein:
the third user is within a predetermined number of connections from the holder within the online trust network of the third user, and the third user is not directly connected to the holder within the online trust network of the third user;
the one or more trust categories are arranged in a hierarchy;
a level discount comprises a calculation of $p(1-r)$, where p comprises a trust level and r comprises a fixed amount by which the trust level is reduced, the trust level comprises the first trust level or the second trust level;
the second trust indication between the second user and the third user is propagated to a lower level of the hierarchy without the level discount;
the second trust indication between the second user and the third user is propagated to a higher level of the hierarchy with the level discount; and
the level discount further comprises a transitive trust level for the third user within a first trust graph of the first user, wherein the transitive trust level is for the third user based on:

calculating the transitive trust level for the third user in the first trust graph of the first user based at least in part on a level of trust between the first user and the second user in the first trust graph of the first user; and discounting the transitive trust level for the third user by a predefined amount based on the level of trust between the first user and the second user;

receiving, with the computer server system, a purchase decision from the third user in response to the item recommendation from the holder; and initiating, with the computer server system, the purchase transaction by the third user in response to the item recommendation by the holder.

10. The method of claim 9, wherein:
the computerized social media network content feed comprises:
a weblog associated with the holder, a microblog associated with the holder, or an image collection associated with the holder.

11. The method of claim 9, wherein:
the holder is identified as trusted by a respective user of the one or more users with respect to a first level category of the one or more trust categories; and
the first level category of the one or more trust categories comprises the respective item.

12. The method of claim 9, wherein:
the computerized social media network content feed comprises:
a weblog associated with the holder, a microblog associated with the holder, or an image collection associated with the holder;
the holder is identified as trusted by the second user of the one or more second users with respect to a first level category of the one or more trust categories; and
the first level category of the one or more trust categories comprises the respective item.

13. A system, comprising:
one or more processors; and
memory storing one or more programs to be executed by the one or more processors,
wherein the one or more programs comprise instructions for:
receiving a request for an item recommendation from a third user of one or more third users, wherein a computer server system comprises a recommendation system and a trust calculation system, wherein the recommendation system is configured to determine potential recommenders in an online trust network of the third user of the one or more third users, wherein the trust calculation system is configured to build a trust graph by identifying trust levels between trusted users in the online trust network of the third user based on trust data, wherein the trusted users comprise a holder, a first user, one or more second users, and the third user of the one or more third users;
receiving a computerized social media network content feed, wherein the computerized social media network content feed is associated with the holder, wherein the computerized social media network content feed is configured to be scraped for product information;
identifying at least one post within the computerized social media network content feed comprising a mention of a respective item in a trust category of one or more trust categories;
determining, with the computer server system, by natural language processing or text mining, that the mention of the respective item is positive;
generating the item recommendation corresponding to the respective item based at least in part on the determining that the mention of the respective item is positive;
associating the item recommendation with a profile associated with the holder;
sending instructions to present the item recommendation to the third user of the one or more third users, the holder being within the online trust network of the third user of the one or more third users, the online trust network comprising:
trust information between the holder and one or more users, each of the one or more users comprising an associated level of trust with the holder and one or more other users of the one or more users, the one or more users comprising the one or more second users;
a first trust indication from a second user of the one or more second users to the holder, the first trust indication not being directly from the third user to the holder, the first trust indication comprises:
a first trust level from the second user of the one or more second users to the holder; and
the trust category of the one or more trust categories in which the second user trusts the holder;
a second trust indication from the third user of the one or more third users to the second user of the one or more second users, the second trust indication comprising:
a second trust level from the third user to the second user; and
the trust category of the one or more trust categories in which the third user trusts the second user;
an implicit trust indication from the third user of the one or more third users to the holder based at least in part on the first trust indication from the second user of the one or more second users to the holder and the second trust indication from the third user of the one or more third users to the second user, wherein:
the third user is within a predetermined number of connections from the holder within the online trust network of the third user, and the third user is not directly connected to the holder within the online trust network of the third user;
the one or more trust categories are arranged in a hierarchy;
a level discount comprises a calculation of $p(1-r)$, where p comprises a trust level and r comprises a fixed amount by which the trust level is reduced, the trust level comprises the first trust level or the second trust level;
the second trust indication between the second user and the third user is propagated to a lower level of the hierarchy without the level discount;
the second trust indication between the second user and the third user is propagated to a higher level of the hierarchy with the level discount; and the level discount further comprises a transitive trust level for the third user within a first trust graph of the first user, wherein the transitive trust level is for the third user based on:
  calculating the transitive trust level for the third user in the first trust graph of the first user based at least in part on a level of trust between the first user and the second user in the first trust graph of the first user; and
  discounting the transitive trust level for the third user by a predefined amount based on the level of trust between the first user and the second user;
receiving a purchase decision from the third user in response to the item recommendation from the holder; and
initiating the purchase transaction by the third user in response to the item recommendation by the holder.

14. The system of claim 13, wherein:
the profile associated with the holder corresponds to a user account associated with the holder for an online network associated with the online trust network of the third user.

15. The system of claim 13, wherein:
the one or more programs further comprise instructions for:
  determining when a user account associated with the holder for an online network associated with the online trust network of the third user is active;
    when the user account associated with the holder is inactive:
      generate the profile associated with the holder; and
    when the user account associated with the holder is active:
      corresponding the profile associated with the holder to the user account associated with the holder.

16. The system of claim 15, wherein:
when the user account associated with the holder is inactive:
  send an invitation to the holder to activate the user account; and
  correspond the profile associated with the holder to the user account associated with the holder upon activation of the user account.

17. The system of claim 13, wherein:
the computerized social media network content feed comprises:
  a weblog associated with the holder, a microblog associated with the holder, or an image collection associated with the holder.

18. The system of claim 13, wherein:
the request for the item recommendation includes an indication to initiate a transaction to purchase the item recommendation.

19. The system of claim 13, wherein:
the one or more programs further comprise instructions for:
  determining when a user account associated with the holder for an online network associated with the online trust network of the third user is active;
  when the user account associated with the holder is inactive:
    generate the profile associated with the holder;
    send an invitation to the holder to activate the user account; and
    correspond the profile associated with the holder to the user account associated with the holder upon activation of the user account; and
  when the user account associated with the holder is active:
    correspond the profile associated with the holder to the user account associated with the holder;
the computerized social media network content feed comprises:
  a weblog associated with the holder, a microblog associated with the holder, or an image collection associated with the holder; and
  the request for the item recommendation includes an indication to initiate a transaction to purchase the item recommendation.

* * * * *